United States Patent
Weiner et al.

(10) Patent No.: US 10,108,963 B2
(45) Date of Patent: Oct. 23, 2018

(54) SYSTEM AND METHOD FOR SECURE TRANSACTION PROCESS VIA MOBILE DEVICE

(71) Applicant: Ping Identity Corporation, Denver, CO (US)

(72) Inventors: Avish Jacob Weiner, Tel Aviv (IL); Ran Ne'man, Ramat Gan (IL)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 14/511,751

(22) Filed: Oct. 10, 2014

(65) Prior Publication Data

US 2015/0073992 A1    Mar. 12, 2015

Related U.S. Application Data

(63) Continuation of application No. PCT/IL2013/050318, filed on Apr. 10, 2013, which is
(Continued)

(51) Int. Cl.
*G06Q 20/42* (2012.01)
*G06Q 20/32* (2012.01)
(Continued)

(52) U.S. Cl.
CPC ....... *G06Q 20/425* (2013.01); *G06Q 20/3223* (2013.01); *G06Q 20/3278* (2013.01); *G06Q 20/40* (2013.01); *H04W 12/06* (2013.01)

(58) Field of Classification Search
USPC ........................................................ 705/64
See application file for complete search history.

(56) References Cited

U.S. PATENT DOCUMENTS 5,153,918 A * 10/1992 Tuai .......................... G06F 3/16
                                                             713/182
5,311,596 A *  5/1994 Scott ....................... G06F 21/31
                                                             380/266
(Continued)

FOREIGN PATENT DOCUMENTS

CN           1533088 A      9/2004
CN         101583968 A     11/2009
(Continued)

OTHER PUBLICATIONS

Office Action for U.S. Appl. No. 13/520,185, dated Jul. 9, 2015.
(Continued)

*Primary Examiner* — Mamon Obeid

(57) ABSTRACT

A system providing enhanced security for device based transactions, constituted of:
a server associated with a network address; a first device associated with a user, the first device in communication with the server over a first communication channel responsive to an obtained server network address; a second device associated with the user arranged to obtain the server network address from the first device; and a mobile device server in communication with the second device over a second communication channel, the mobile device server in communication with the server via a third communication channel, the mobile device server arranged to: obtain the server network address from the second device over the second communication channel; obtain the server network address from a trusted source; and authorize to the server over third communication channel a transaction only in the event that the server network addresses are consonant.

28 Claims, 13 Drawing Sheets

Related U.S. Application Data a continuation of application No. 13/442,861, filed on Apr. 10, 2012, now Pat. No. 8,346,672.

(51) Int. Cl.
*H04W 12/06* (2009.01)
*G06Q 20/40* (2012.01)

(56) References Cited

U.S. PATENT DOCUMENTS

| | | | |
|---|---|---|---|
| 5,420,606 A | 5/1995 | Begum et al. | |
| 5,559,961 A * | 9/1996 | Blonder | G06F 21/36 |
| | | | 726/18 |
| 5,875,394 A * | 2/1999 | Daly | H04L 63/0869 |
| | | | 340/5.74 |
| 5,892,900 A | 4/1999 | Ginter et al. | |
| 5,903,721 A * | 5/1999 | Sixtus | G06Q 20/02 |
| | | | 726/2 |
| 5,915,001 A * | 6/1999 | Uppaluru | H04M 3/4938 |
| | | | 379/88.17 |
| 5,991,407 A | 11/1999 | Murto | |
| 6,082,620 A | 7/2000 | Bone, Jr. | |
| 6,338,140 B1 | 1/2002 | Owens et al. | |
| 6,510,502 B1 | 1/2003 | Shimizu | |
| 6,584,309 B1 * | 6/2003 | Whigham | G06Q 10/087 |
| | | | 455/407 |
| 6,687,346 B1 | 2/2004 | Swartz et al. | |
| 6,705,517 B1 | 3/2004 | Zajkowski et al. | |
| 6,760,711 B1 * | 7/2004 | Gillett | G06F 21/6209 |
| | | | 705/64 |
| 7,028,906 B2 | 4/2006 | Challa et al. | |
| 7,076,468 B2 * | 7/2006 | Hillegass | G06F 21/10 |
| | | | 705/56 |
| 7,137,006 B1 * | 11/2006 | Grandcolas | G06F 21/41 |
| | | | 713/180 |
| 7,257,834 B1 * | 8/2007 | Boydstun | G06F 21/31 |
| | | | 707/999.009 |
| 7,263,717 B1 * | 8/2007 | Boydstun | H04L 63/08 |
| | | | 707/999.009 |
| 7,347,361 B2 | 3/2008 | Lovett | |
| 7,356,510 B2 | 4/2008 | Durand et al. | |
| 7,373,515 B2 * | 5/2008 | Owen | G06F 21/31 |
| | | | 713/182 |
| 7,392,226 B1 | 6/2008 | Sasaki et al. | |
| 7,409,543 B1 * | 8/2008 | Bjorn | H04L 9/0825 |
| | | | 380/255 |
| 7,509,119 B2 | 3/2009 | Eonnet | |
| 7,529,710 B1 * | 5/2009 | Clower | G06Q 20/10 |
| | | | 705/39 |
| 7,698,276 B2 * | 4/2010 | Seshadri | G06Q 30/02 |
| | | | 719/318 |
| 7,706,784 B2 | 4/2010 | Weiner et al. | |
| 7,774,231 B2 | 8/2010 | Pond et al. | |
| 7,778,840 B2 * | 8/2010 | Krause | G06Q 10/10 |
| | | | 705/1.1 |
| 7,801,829 B2 * | 9/2010 | Gray | G06Q 20/00 |
| | | | 705/76 |
| 7,870,599 B2 * | 1/2011 | Pemmaraju | G06F 21/32 |
| | | | 340/5.8 |
| 7,962,762 B2 | 6/2011 | Kirsch et al. | |
| 8,032,927 B2 * | 10/2011 | Ross | G06F 21/33 |
| | | | 705/53 |
| 8,108,318 B2 | 1/2012 | Mardikar | |
| 8,185,956 B1 * | 5/2012 | Bogorad | H04L 63/105 |
| | | | 709/223 |
| 8,244,211 B2 | 8/2012 | Clark | |
| 8,306,879 B2 | 11/2012 | Nonaka | |
| 8,346,672 B1 * | 1/2013 | Weiner | H04W 12/06 |
| | | | 705/64 |
| 8,359,278 B2 * | 1/2013 | Domenikos | G06Q 40/08 |
| | | | 705/1.1 |
| 8,443,191 B2 * | 5/2013 | Beckwith | H04L 9/3294 |
| | | | 713/167 |
| 8,453,940 B2 * | 6/2013 | Diamond | G06Q 20/04 |
| | | | 235/380 |
| 8,479,022 B2 | 7/2013 | Dahan et al. | |
| 8,494,961 B1 | 7/2013 | Lucas et al. | |
| 8,510,820 B2 | 8/2013 | Oberheide et al. | |
| 8,578,454 B2 | 11/2013 | Grim | |
| 8,615,794 B1 * | 12/2013 | Tomilson | G06F 21/6218 |
| | | | 713/182 |
| 8,626,139 B2 * | 1/2014 | Kirkup | H04L 63/0227 |
| | | | 455/410 |
| 8,736,424 B2 | 5/2014 | Shoarinejad et al. | |
| 8,739,259 B1 * | 5/2014 | Kumar | H04L 51/38 |
| | | | 726/7 |
| 8,763,077 B2 | 6/2014 | Oberheide et al. | |
| 8,763,097 B2 * | 6/2014 | Bhatnagar | G06F 21/35 |
| | | | 709/217 |
| 8,799,410 B2 * | 8/2014 | Fiatal | H04L 51/24 |
| | | | 709/203 |
| 8,805,434 B2 * | 8/2014 | Vasudevan | B60R 25/24 |
| | | | 340/3.32 |
| 8,887,257 B2 | 11/2014 | Haggerty et al. | |
| 9,098,850 B2 | 8/2015 | Weiner et al. | |
| 9,196,111 B1 | 11/2015 | Newman et al. | |
| 9,353,339 B2 * | 5/2016 | Choi | H01L 21/02068 |
| 9,628,508 B2 | 4/2017 | Turbin | |
| 9,781,105 B2 * | 10/2017 | Weiner | H04L 63/0853 |
| 9,830,594 B2 | 11/2017 | Weiner | |
| 9,886,688 B2 * | 2/2018 | Weiner | G06Q 20/3227 |
| 2001/0014870 A1 | 8/2001 | Saito et al. | |
| 2002/0023027 A1 * | 2/2002 | Simonds | G06K 7/1095 |
| | | | 705/26.1 |
| 2002/0028671 A1 * | 3/2002 | I'Anson | H04W 4/02 |
| | | | 455/414.1 |
| 2002/0042722 A1 * | 4/2002 | Tsuji | G06Q 20/20 |
| | | | 705/24 |
| 2002/0046299 A1 * | 4/2002 | Lefeber | H04L 29/06 |
| | | | 719/318 |
| 2002/0059142 A1 * | 5/2002 | Krause | G06Q 10/10 |
| | | | 705/44 |
| 2002/0091569 A1 | 7/2002 | Kitaura et al. | |
| 2002/0198777 A1 * | 12/2002 | Yuasa | G06Q 20/045 |
| | | | 705/14.26 |
| 2003/0047613 A1 | 3/2003 | Funamoto et al. | |
| 2003/0115150 A1 * | 6/2003 | Hamilton | G06Q 20/00 |
| | | | 705/64 |
| 2003/0149663 A1 | 8/2003 | Vonholm et al. | |
| 2003/0163384 A1 | 8/2003 | Hendra | |
| 2003/0163567 A1 * | 8/2003 | McMorris | H04L 29/06 |
| | | | 709/225 |
| 2003/0193441 A1 | 10/2003 | Zimmerman et al. | |
| 2003/0225618 A1 * | 12/2003 | Hessburg | G06Q 10/02 |
| | | | 705/14.27 |
| 2004/0059909 A1 * | 3/2004 | Le Pennec | H04L 63/12 |
| | | | 713/153 |
| 2004/0068481 A1 * | 4/2004 | Seshadri | G06F 17/30867 |
| 2004/0117254 A1 | 6/2004 | Nemirofsky et al. | |
| 2004/0117262 A1 | 6/2004 | Berger et al. | |
| 2004/0121781 A1 | 6/2004 | Sammarco | |
| 2004/0168083 A1 * | 8/2004 | Gasparini | G06F 21/31 |
| | | | 726/10 |
| 2004/0186768 A1 | 9/2004 | Wakim et al. | |
| 2004/0187018 A1 * | 9/2004 | Owen | G06F 21/31 |
| | | | 713/184 |
| 2004/0243519 A1 | 12/2004 | Perttila et al. | |
| 2005/0027700 A1 * | 2/2005 | Turner | G06Q 20/12 |
| 2005/0071673 A1 | 3/2005 | Saito | |
| 2005/0091539 A1 | 4/2005 | Wang et al. | |
| 2005/0120213 A1 | 6/2005 | Winget et al. | |
| 2005/0165684 A1 * | 7/2005 | Jensen | G06Q 20/00 |
| | | | 705/44 |
| 2005/0166060 A1 | 7/2005 | Goldthwait et al. | |
| 2005/0175019 A1 * | 8/2005 | Kalavade | H04L 63/0823 |
| | | | 370/400 |
| 2005/0181734 A1 * | 8/2005 | Coutts | H04W 48/18 |
| | | | 455/67.16 |
| 2005/0239445 A1 * | 10/2005 | Karaoguz | H04L 12/2803 |
| | | | 455/414.1 |

(56) References Cited

U.S. PATENT DOCUMENTS

| | | | |
|---|---|---|---|
| 2005/0242921 A1 | 11/2005 | Zimmerman et al. | |
| 2005/0246243 A1* | 11/2005 | Adams | G06Q 10/00 705/55 |
| 2005/0254514 A1* | 11/2005 | Lynn | G06F 21/00 370/450 |
| 2005/0255889 A1 | 11/2005 | Haseba et al. | |
| 2005/0258237 A1* | 11/2005 | Urakami | G06Q 20/32 235/380 |
| 2005/0289652 A1* | 12/2005 | Sharma | G06Q 20/341 726/26 |
| 2006/0041755 A1* | 2/2006 | Pemmaraju | G06F 21/32 713/182 |
| 2006/0044115 A1 | 3/2006 | Doi et al. | |
| 2006/0089912 A1* | 4/2006 | Spagna | G06F 21/10 705/51 |
| 2006/0090067 A1* | 4/2006 | Edmonds | H04L 63/083 713/159 |
| 2006/0153172 A1* | 7/2006 | Yamada | H04W 64/00 370/352 |
| 2006/0165060 A1 | 7/2006 | Dua | |
| 2006/0174322 A1 | 8/2006 | Turner et al. | |
| 2006/0174332 A1 | 8/2006 | Bauban et al. | |
| 2006/0206709 A1* | 9/2006 | Labrou | G06Q 20/18 713/167 |
| 2006/0230145 A1 | 10/2006 | Zarakhovsky et al. | |
| 2006/0235796 A1 | 10/2006 | Johnson et al. | |
| 2006/0237528 A1 | 10/2006 | Bishop et al. | |
| 2006/0259967 A1* | 11/2006 | Thomas | H04L 63/145 726/22 |
| 2006/0271643 A1 | 11/2006 | Stallman | |
| 2007/0055749 A1* | 3/2007 | Chien | G06F 21/645 709/219 |
| 2007/0078962 A1* | 4/2007 | Donnelli | A63F 13/12 709/223 |
| 2007/0088950 A1* | 4/2007 | Wheeler | G06Q 20/00 713/170 |
| 2007/0107044 A1 | 5/2007 | Yuen et al. | |
| 2007/0156436 A1* | 7/2007 | Fisher | G06Q 20/102 455/552.1 |
| 2007/0192245 A1 | 8/2007 | Fisher et al. | |
| 2007/0194123 A1* | 8/2007 | Frantz | G06K 17/0022 235/462.45 |
| 2007/0202894 A1 | 8/2007 | Dhebri et al. | |
| 2007/0214155 A1 | 9/2007 | Chang et al. | |
| 2007/0255653 A1 | 11/2007 | Tumminaro et al. | |
| 2008/0028228 A1* | 1/2008 | Mardikar | H04L 63/08 713/184 |
| 2008/0084272 A1 | 4/2008 | Modiano | |
| 2008/0091618 A1* | 4/2008 | Obrea | G06F 21/31 705/76 |
| 2008/0097925 A1* | 4/2008 | King | G06Q 20/02 705/67 |
| 2008/0104691 A1* | 5/2008 | Takeda | H04L 63/10 726/14 |
| 2008/0147546 A1* | 6/2008 | Weichselbaumer | G06Q 20/105 705/41 |
| 2008/0168050 A1* | 7/2008 | Reyes | G06F 3/038 |
| 2008/0208759 A1 | 8/2008 | Royyuru | |
| 2008/0210754 A1 | 9/2008 | Lovett | |
| 2008/0222031 A1 | 9/2008 | Shattner et al. | |
| 2008/0227471 A1 | 9/2008 | Dankar et al. | |
| 2008/0270301 A1 | 10/2008 | Jones et al. | |
| 2008/0307515 A1 | 12/2008 | Drokov et al. | |
| 2009/0044025 A1 | 2/2009 | She | |
| 2009/0062939 A1 | 3/2009 | Park | |
| 2009/0076966 A1* | 3/2009 | Bishop | G06Q 20/027 705/67 |
| 2009/0119190 A1 | 5/2009 | Realini | |
| 2009/0119756 A1* | 5/2009 | Acuna | G06Q 20/02 726/5 |
| 2009/0119757 A1* | 5/2009 | Acuna | G06F 21/6245 726/5 |
| 2009/0138366 A1 | 5/2009 | Bemmel et al. | |
| 2009/0158034 A1* | 6/2009 | Gu | H04L 63/08 713/156 |
| 2009/0165121 A1 | 6/2009 | Kumar | |
| 2009/0217359 A1* | 8/2009 | Kikkawa | H04L 63/08 726/5 |
| 2009/0233579 A1 | 9/2009 | Castell et al. | |
| 2009/0235178 A1 | 9/2009 | Cipriani et al. | |
| 2009/0249439 A1* | 10/2009 | Olden | H04L 63/0815 726/1 |
| 2009/0287565 A1 | 11/2009 | Bishop et al. | |
| 2009/0288012 A1 | 11/2009 | Hertel et al. | |
| 2009/0291685 A1* | 11/2009 | Morimoto | H04B 7/155 455/436 |
| 2009/0292619 A1* | 11/2009 | Kagan | G06Q 20/102 705/26.1 |
| 2009/0305725 A1 | 12/2009 | Shin et al. | |
| 2009/0307142 A1* | 12/2009 | Mardikar | G06Q 20/1085 705/72 |
| 2009/0320134 A1* | 12/2009 | Corcoran | G06F 21/562 726/24 |
| 2010/0031349 A1 | 2/2010 | Bingham | |
| 2010/0049615 A1 | 2/2010 | Rose et al. | |
| 2010/0057843 A1 | 3/2010 | Landsman et al. | |
| 2010/0114776 A1 | 5/2010 | Weller et al. | |
| 2010/0144314 A1* | 6/2010 | Sherkin | G06F 21/33 455/411 |
| 2010/0146263 A1 | 6/2010 | Das et al. | |
| 2010/0161410 A1 | 6/2010 | Tulloch | |
| 2010/0179907 A1 | 7/2010 | Atkinson | |
| 2010/0199086 A1 | 8/2010 | Kuang et al. | |
| 2010/0262830 A1 | 10/2010 | Kusakawa et al. | |
| 2010/0268618 A1* | 10/2010 | McQuilken | G06Q 20/32 705/26.1 |
| 2010/0306113 A1* | 12/2010 | Gray | G06Q 20/00 705/76 |
| 2010/0312703 A1 | 12/2010 | Kulpati et al. | |
| 2010/0318801 A1 | 12/2010 | Roberge et al. | |
| 2011/0022484 A1 | 1/2011 | Smith et al. | |
| 2011/0070901 A1 | 3/2011 | Alward | |
| 2011/0071978 A1* | 3/2011 | Lottridge | G06Q 10/10 706/54 |
| 2011/0078081 A1 | 3/2011 | Pirzadeh et al. | |
| 2011/0109426 A1* | 5/2011 | Harel | G06Q 50/10 340/5.6 |
| 2011/0119155 A1 | 5/2011 | Hammad et al. | |
| 2011/0131419 A1 | 6/2011 | Dowds et al. | |
| 2011/0137804 A1 | 6/2011 | Peterson | |
| 2011/0196946 A1* | 8/2011 | Manchester | H04L 29/06 709/220 |
| 2011/0219230 A1 | 9/2011 | Oberheide et al. | |
| 2011/0251892 A1* | 10/2011 | Laracey | G06Q 30/0253 705/14.51 |
| 2011/0251955 A1 | 10/2011 | Lam | |
| 2011/0265149 A1* | 10/2011 | Ganesan | H04L 9/3226 726/4 |
| 2012/0005026 A1 | 1/2012 | Khan et al. | |
| 2012/0011058 A1* | 1/2012 | Pitroda | G06Q 20/02 705/39 |
| 2012/0031969 A1 | 2/2012 | Hammad | |
| 2012/0130714 A1 | 5/2012 | Zeljkovic et al. | |
| 2012/0144461 A1 | 6/2012 | Rathbun | |
| 2012/0185932 A1 | 7/2012 | Stougaard et al. | |
| 2012/0198228 A1 | 8/2012 | Oberheide et al. | |
| 2012/0201190 A1* | 8/2012 | Sawai | H04B 7/15542 370/315 |
| 2012/0240204 A1* | 9/2012 | Bhatnagar | G06F 21/35 726/5 |
| 2012/0246702 A1* | 9/2012 | Shepler | G06F 21/335 726/4 |
| 2012/0303528 A1 | 11/2012 | Weiner et al. | |
| 2012/0309291 A1* | 12/2012 | Sawai | H04B 7/15542 455/7 |
| 2012/0331536 A1* | 12/2012 | Chabbewal | G06F 21/33 726/7 |
| 2013/0023240 A1 | 1/2013 | Weiner et al. | |

(56) References Cited

U.S. PATENT DOCUMENTS

| | | | |
|---|---|---|---|
| 2013/0031006 A1* | 1/2013 | McCullagh | G06Q 20/36 705/66 |
| 2013/0046976 A1 | 2/2013 | Rosati et al. | |
| 2013/0054320 A1* | 2/2013 | Dorso | G06Q 30/0268 705/14.4 |
| 2013/0080327 A1* | 3/2013 | Baldrick | G06Q 20/40 705/44 |
| 2013/0117822 A1 | 5/2013 | Soulez | |
| 2013/0204690 A1 | 8/2013 | Liebmann | |
| 2013/0212387 A1 | 8/2013 | Oberheide et al. | |
| 2013/0252583 A1* | 9/2013 | Brown | H04W 12/06 455/411 |
| 2013/0267200 A1* | 10/2013 | Weiner | H04W 12/06 455/411 |
| 2013/0347094 A1 | 12/2013 | Bettini et al. | |
| 2014/0013387 A1* | 1/2014 | Vangpat | H04L 63/0815 726/2 |
| 2014/0013390 A1* | 1/2014 | Sade | G06F 21/42 726/3 |
| 2014/0040149 A1 | 2/2014 | Fiske | |
| 2014/0067509 A1 | 3/2014 | Weiner | |
| 2014/0074637 A1* | 3/2014 | Hammad | G06Q 20/12 705/21 |
| 2014/0114846 A1 | 4/2014 | Weiner | |
| 2014/0164253 A1* | 6/2014 | Dominguez | G06Q 20/40 705/67 |
| 2014/0214688 A1 | 7/2014 | Weiner et al. | |
| 2014/0236834 A1* | 8/2014 | Appalsamy | G06Q 20/382 705/64 |
| 2014/0282961 A1 | 9/2014 | Dorfman et al. | |
| 2014/0358780 A1* | 12/2014 | Fujioka | G06F 21/34 705/44 |
| 2014/0376385 A1 | 12/2014 | Boss et al. | |
| 2015/0023160 A1* | 1/2015 | Alisawi | H04L 47/32 370/230 |
| 2015/0073992 A1* | 3/2015 | Weiner | H04W 12/06 705/44 |
| 2015/0142589 A1 | 5/2015 | Jin et al. | |
| 2015/0304850 A1* | 10/2015 | Weiner | H04W 12/06 726/7 |
| 2016/0330199 A1* | 11/2016 | Weiner | H04L 63/0853 |
| 2017/0099137 A1* | 4/2017 | Pang | H04L 9/0825 |
| 2018/0035481 A1* | 2/2018 | Panther | H04L 63/0471 |

FOREIGN PATENT DOCUMENTS

| | | |
|---|---|---|
| CN | 101916487 A | 12/2010 |
| CN | 102057385 A | 5/2011 |
| EP | 1424861 | 6/2004 |
| EP | 1 460 573 | 9/2004 |
| EP | 2611097 | 7/2013 |
| FR | 2 832 829 | 5/2003 |
| GB | 2460304 | 12/2009 |
| JP | H10-145354 A | 5/1998 |
| JP | 2001-084311 | 3/2001 |
| JP | 2005-173982 | 6/2005 |
| JP | 2005-215849 | 8/2005 |
| JP | 2005-276025 | 10/2005 |
| JP | 2005-533316 | 11/2005 |
| JP | 2006-014159 | 1/2006 |
| JP | 2006-171855 A | 6/2006 |
| JP | 2006-197458 A | 7/2006 |
| JP | 2006-221351 | 8/2006 |
| JP | 2006-338638 | 12/2006 |
| JP | 2006-350450 | 12/2006 |
| JP | 2007-188150 | 7/2007 |
| JP | 2007-280363 | 10/2007 |
| JP | 2008-210368 | 9/2008 |
| JP | 2008-287321 A | 11/2008 |
| JP | 2009-058637 | 3/2009 |
| JP | 2009-193155 | 8/2009 |
| JP | 2010-009161 | 1/2010 |
| JP | 2010-231777 | 10/2010 |
| JP | 2010-250374 | 11/2010 |
| JP | 2011-002994 A | 1/2011 |
| JP | 2011-053767 | 3/2011 |
| WO | WO 1998/034421 | 8/1998 |
| WO | WO 2001/073580 | 10/2001 |
| WO | WO 2002/008981 | 1/2002 |
| WO | WO 2002/019199 | 3/2002 |
| WO | WO 2002/042926 | 5/2002 |
| WO | WO 2002/060209 | 8/2002 |
| WO | WO 2002/102099 | 12/2002 |
| WO | WO 2003/027937 | 4/2003 |
| WO | WO 2003/046847 | 6/2003 |
| WO | WO 2006/090392 | 8/2006 |
| WO | WO 2006/102848 | 10/2006 |
| WO | WO 2007/021658 | 2/2007 |
| WO | WO 2007/048976 | 5/2007 |
| WO | WO 2007/106906 | 9/2007 |
| WO | WO 2007/117073 | 10/2007 |
| WO | WO 2008/027620 | 3/2008 |
| WO | WO 2009/032687 | 3/2009 |
| WO | WO 2009/113057 | 9/2009 |
| WO | WO 2009/156880 | 12/2009 |
| WO | WO 2009/158570 | 12/2009 |
| WO | WO 2010/087535 | 8/2010 |
| WO | WO 2010/111023 | 9/2010 |
| WO | WO 2010/120222 | 10/2010 |
| WO | WO 2010/140876 | 12/2010 |
| WO | WO 2011/014837 | 2/2011 |
| WO | WO 2011/074500 | 6/2011 |
| WO | WO 2011/083471 | 7/2011 |
| WO | WO 2012/156977 | 11/2012 |
| WO | WO 2012/168940 | 12/2012 |
| WO | WO 2013/030832 | 3/2013 |
| WO | WO 2013/153552 | 10/2013 |

OTHER PUBLICATIONS

Final Office Action for U.S. Appl. No. 13/520,185, dated Jan. 6, 2016.
First Office Action for Chinese Application No. 201280035348.3, dated Jan. 29, 2016.
Office Action for U.S. Appl. No. 14/240,395, dated Aug. 31, 2015.
Office Action for U.S. Appl. No. 13/731,028, dated Nov. 5, 2015.
Office Action for U.S. Appl. No. 13/625,148, dated Apr. 10, 2014.
Office Action for U.S. Appl. No. 13/625,148, dated Jun. 14, 2013.
Office Action for U.S. Appl. No. 13/625,148, dated Jan. 10, 2014.
Office Action for U.S. Appl. No. 14/755,707, dated Oct. 21, 2015.
Office Action for U.S. Appl. No. 14/703,189, dated Aug. 13, 2015.
Final Office Action for U.S. Appl. No. 14/703,189, dated Mar. 7, 2016.
Vamosi et al., "Multi-Channel Authentication Via Mobile Banking," Javelin Strategy & Research, Sep. 2009, Pleasanton, CA.
Office Action for U.S. Appl. No. 13/520,185, dated Jul. 29, 2016.
Office Action for U.S. Appl. No. 14/118,232, dated Apr. 21, 2016.
Office Action for Japanese Application No. 2014-510948, dated Jun. 28, 2016.
Office Action for Japanese Application No. 2014-514222, dated May 24, 2016.
Office Action for U.S. Appl. No. 14/124,719, dated Jun. 16, 2016.
Final Office Action for U.S. Appl. No. 14/240,395, dated Apr. 7, 2016.
Office Action for U.S. Appl. No. 14/240,395, dated Oct. 20, 2016.
Office Action for Japanese Application No. 2014-527810, dated Apr. 26, 2016.
Final Office Action for U.S. Appl. No. 13/731,028, dated Jun. 8, 2016.
Final Office Action for U.S. Appl. No. 14/755,707, dated May 12, 2016.
Office Action for U.S. Appl. No. 14/703,189, dated Sep. 23, 2016.
Shirali-Shahreza, Mohammed et al. "Drawing CAPTCHA," 28th International Conference on Information Technology Interfaces, 2006, pp. 475-480, DOI: 10.1109/ITI.2006.1708527.
Summons to Attend Oral Proceedings for European Application No. 11731739.6, mailed Jul. 14, 2017, 8 pages.

(56) References Cited

OTHER PUBLICATIONS

Office Action for U.S. Appl. No. 13/520,185, dated Feb. 10, 2017, 18 pages.
Office Action for U.S. Appl. No. 13/520,185, dated Jul. 26, 2017, 17 pages.
Office Action for U.S. Appl. No. 14/118,232, dated Nov. 14, 2016, 76 pages.
Office Action for Israeli Application No. 229881, dated Mar. 20, 2017, 2 pages.
Office Action for U.S. Appl. No. 14/124,719, dated Sep. 7, 2017, 48 pages.
Office Action for U.S. Appl. No. 14/124,719, dated Jan. 30, 2017, 22 pages.
Office Action for European Application No. 12778808.1, dated Jan. 20, 2016, 5 pages.
Office Action for U.S. Appl. No. 14/240,395, dated Mar. 30, 2017, 17 pages.
Office Action for Japanese Application No. 2014-527810, dated Mar. 14, 2017, 8 pages.
Examination Report No. 1 for Australian Application No. 2013248166, dated Aug. 2, 2017, 4 pages.
Office Action for European Application No. 13723251.8, dated Aug. 7, 2017, 8 pages.
Office Action for U.S. Appl. No. 13/731,028, dated Nov. 9, 2016, 31 pages.
Office Action for U.S. Appl. No. 13/731,028, dated Apr. 13, 2017, 25 pages.
Office Action for U.S. Appl. No. 14/755,707, dated Nov. 17, 2016, 15 pages.
Office Action for U.S. Appl. No. 14/755,707, dated Jun. 12, 2017, 13 pages.
Balaban, D., "Pioneering NFC Provider Service Provider Adds Bar Codes to New NFC Trial," Published on Apr. 27, 2010, archived on May 8, 2010, retrieved <http://www.nfctimes.com/news/pioneering-nfc-service-provider-adds-bar-codes-new-nfc-trial>, 6 pages.
Ericsson Inc., "One-time password using short message service, paging, and other telephony techniques," Research Disclo, Mason Publications, Hamshire, GB, vol. 423, No. 58, Jul. 1, 1999—Annex to Summons to attend oral proceedings for European Application No. 11731739.6, dated Jul. 14, 2017, 1 page.
Office Action for Japanese Patent Application No. 2015-505068, dated Mar. 16, 2017.
Office Action for U.S. Appl. No. 13/520,185, dated Feb. 9, 2018, 21 pages.
Office Action for European Application No. 12738221.6, dated Apr. 30, 2018, 10 pages.
Office Action for U.S. Appl. No. 14/124,719, dated Apr. 17, 2018, 33 pages.
Latze et al., "A Proof of Concept Implementation of a Secure E-Commerce Authentication Scheme", Jul. 2009, Information Security South Africa, Johannesberg, South Africa, retrieved from Internet on Jun. 25, 2012 from http://www.latze.ch/latze-ruppen-ultesnitsche.pdf.
Mcheck Brochure, Retrieved from Internet on Jun. 25, 2012 from http://main.mchek.com/pdf/mchek-brochure.pdf.
Gao, "P2P-Paid: A Peer-to-Peer Wireless Payment System", Proceedings of the 2005 Second IEEE International Workshop on Mobile Commerce and Services (WMCS'05), 2005, 0-7695-2391-9/05, Institute of Electrical and Electronics Engineers.
International Search Report for PCT application PCT/IL2011/00015, Issued by the USPTO, dated May 23, 2011.
Carr, "Mobile Payment Systems and Services: An Introduction", 2007, Retrieved from Internet on Jun. 25, 2012 from http://www.mpf.org.in/pdf/Mobile%20Payment%20Systems%20and%20Services.pdf.
"Mobile Payment", Wikipedia, the free encyclopedia, Accessed n Jan. 20, 2010.
Fun et al., "Privacy in New Mobile Payment Protocol", World Academy of Science, Engineering and Technology, 2008, issue 47, pp. 443-447.
Screen Shot of web site of Mobiqa Airlines, Retrieved from the Internet on Dec. 9, 2009 from http://www.mobiqa.com/airlines/?gclid=CLqyxOefyZ4CFWlr4wodbx7wrg.
"IPCS & barcode enabling mobile payment", Retrieved from the Internet on Jun. 25, 2012 from http://www.ipcslive.com/pdf/IPCSbar.pdf.
International Search Report for PCT application PCT/IL2009/00263, Issued by the EPO, dated Jul. 6, 2009.
Weiss, "Performing Relay Attacks on ISO 14443 Contactless Smart Cards using NFC Mobile Equipment", Master's Thesis in Computer Science, University of Munich, Germany, May 17, 2010.
Mulliner, "Vulnerability Analysis and Attacks on NFC-enabled Mobile Phones", 2009 International Conference on Availability, Reliability and Security, pp. 695-700, 978-0-7695-3564-7/09, Institute of Electrical and Electronic Engineers.
Mulliner, "Vulnerability Analysis and Attacks on NFC-enabled Mobile Phones", 25th Chaos Communication Congress, Dec. 2008, Berlin, Germany.
"Is NFC too Slow?", Insight-Driven Retailing Blog, Oracle, Retrieved from the Internet on May 15, 2011.
Heine, "GSM Networks: Protocolas, Terminology, and Implementation", 1999, pp. 116 and 328, Artech House, Inc., Norwood, MA.
Newton's Telecom Dictionary, Jul. 2010, 'Mixed Mode'—'MNA', CMP Books, Gilroy, CA.
Written Opinion of the International Searching Agency for PCT application PCT/IL2011/00015, Issued by the USPTO, dated May 23, 2011.
Written Opinion of the International Searching Agency for PCT application PCT/IL2009/00263, Issued by the EPO, dated Jul. 6, 2009.
Miller, "Payment Method Bypasses the Wallet", The New York Times Reprint, May 23, 2011.
International Search Report and Written Opinion for PCT application PCT/IL2013/050318, Issued by the EPO, dated Jul. 31, 2013.
International Search Report and Written Opinion for PCT application PCT/IL2012/050328, Issued by the EPO, dated Dec. 21, 2012.
International Search Report and Written Opinion for PCT application PCT/IL2012/050199, Issued by the EPO, dated Sep. 26, 2012.
International Search Report and Written Opinion for PCT application PCT/IL2012/050178, Issued by the EPO, dated Sep. 17, 2012.
Supplementary European Search Report for Application No. EP 11 73 1739, dated Aug. 7, 2013.
Extended European Search Report for European Application No. 18157109.2, dated Jul. 25, 2018, 9 pages.

* cited by examiner

SYSTEM AND METHOD FOR SECURE TRANSACTION PROCESS VIA MOBILE DEVICE

CROSS-REFERENCE TO RELATED APPLICATIONS

This application is a continuation of PCT Patent Application No. PCT/IL2013/050318, filed Apr. 10, 2013, and entitled "SYSTEM AND METHOD FOR SECURE TRANSACTION PROCESS VIA MOBILE DEVICE," which is a continuation of U.S. patent application Ser. No. 13/442,861, filed Apr. 10, 2012, and entitled "SYSTEM AND METHOD FOR SECURE TRANSACTION PROCESS VIA MOBILE DEVICE," now U.S. Pat. No. 8,346,672, each of which is incorporated herein by reference in its entirety.

TECHNICAL FIELD

The present disclosure relates generally to the field of transaction systems and in particular to a system and method for performing a secure transaction utilizing a mobile device.

BACKGROUND ART

Payments by credit or debit cards represent a large portion of consumer spending. Historically, credit or debit cards were encoded with a magnetic stripe, which allows a transaction responsive to a transaction device arranged to read information encoded on the magnetic stripe, in a secured manner. The device reading the magnetic stripe is typically in communication with the credit card issuer via a transaction network, the credit card issuer ultimately approving the transaction. Credit or debit cards are unfortunately susceptible to theft which may be unrealized by the user for a significant period of time.

Advances in technology have led to the development of contactless smart cards, such as those defined under ISO/IEC 7810 and ISO/IEC 14443, also known as Near Field Communication (NFC). Similar technology is available meeting other standards or protocols generally under the term radio frequency identification (RFID), with the range of RFID typically restricted to be of the same order as that of NFC. The term contactless element (CE) as used throughout this document refers to any short range communication device operating under any of NFC, RFID or other short range communication standard with range on the same order as that of NFC, and typically require that the CE be juxtaposed with a reader. The use of optically readable codes are specifically included herein with the definition of a CE. Such CE smart cards may be used for transactions, however since they may be read by any reader within about 4 cm, they do not provide for increased security. As such, CE smart cards are typically only used for low value transactions, wherein a small value is pre-loaded on the CE smart card, and the small value is depreciated with each transaction until a limit is reached.

Mobile devices (MDs) are increasingly being used for financial transactions due to their ubiquity, available screen and input devices. An MD as used herein includes any electronic MD used for personal functionalities such as multimedia playing, data communication over a network or voice communication. One embodiment of an MD is a mobile station, also known as a mobile communication device, mobile phone, mobile telephone, hand phone, wireless phone, cell phone, cellular phone, cellular telephone, mobile handset or cell telephone.

With the development of IEEE 802.11, and the broad establishment of the resultant wireless networks, various MDs have been developed which communicate over available wireless networks in addition to cellular telephone capabilities. Furthermore, various MDs have been developed with the ability to access the Internet both over a wireless network and/or over a cellular network.

The ubiquitous MD, having an associated means for user identification and charging expenses, presents an opportunity to utilize the MD as an electronic wallet. There are several known methods for providing a service or a product, and in particular, payment for products or services other than phone usage or airtime, by using a mobile station.

CEs in cooperation with an MD have been developed into two main groups: devices which are in communication with a controller of the MD, such as to the MD's CPU; and devices which are not in communication with the MD's CPU. In the case of CEs in communication with the MD's CPU one can find various devices, such as NFC devices on SIM cards, also known as "SIM Contactless Element" (SCE), external cards such as SD cards with NFC devices, SIM add-on Contactless Elements (SCCE), and NFC devices found within the MD's hardware. The above group of devices denoted herein as "embedded CE" (ECE) devices can be used in the same manner as CE devices which are not connected to the MD's CPU for applications where the CE reader communicates with the CE device directly and the communication doesn't rely on any action of the MD's CPU. It is to be noted that in the event that the CE comprises an optically readable code displayed on a display of the MD, the MD is inherently an ECE device.

The group of CEs which are not connected to an MD CPU may include NFC or RFID tags, stickers, key fobs, optically readable codes which may be affixed to the MD, and other form factors. Such a CE, when secured in relation to the MD may thus be utilized to provide an identification number read by a reader within proximity of the CE.

As transaction systems have become more sophisticated and in more widespread use, the incidence of fraudulent transactions have also increased. User devices such as portable computers have been successfully hacked into such that access to secure web sites, such as banking and shopping sites, have become problematic, since the password and/or any other entered information may be fraudulently obtained by a surreptitious hacker. Similarly, access to secure web sites from a shared computer, such as an Internet café computer, may compromise both the user name and password of the unsuspecting user.

Key logger software, surreptitiously loaded onto an MD, can easily obtain user information, such as passwords and transfer them to over a communication link to non-authorized parties. Man in the middle attacks substitute a fake transaction server for the actual transaction server and thus obtain user information.

What is needed, and is not provided by the prior art, is a system and method for providing secure transactions in cooperation with an MD, thus providing increased security to a user. Preferably, such a system and method is arranged to permit a transaction only in the event that communication with an authorized network address is confirmed.

SUMMARY OF INVENTION

In view of the discussion provided above and other considerations, the present disclosure provides methods and apparatus to overcome some or all of the disadvantages of prior and present methods of performing a secure transaction. Other new and useful advantages of the present methods and apparatus will also be described herein and can be appreciated by those skilled in the art.

In an exemplary embodiment at least two independent communication channels are provided. A user device obtains a server associated network address, used to establish communication with a provider server. A mobile device server is in communication with the provider server, and obtains the network address of the provider server from a trusted source, such as a database or a secure communication link. The mobile device server inputs from the user device, over a second communication channel, the network address utilized by the user device for communication with the provider server. The transaction is authorized only in the event that the input addresses is consonant with the addresses obtained from the trusted source.

In one embodiment, the user device requesting a transaction is a mobile device, and in another embodiment the user device is computer or other device attempting communication with the transaction provider server. In one embodiment consonance is confirmed by the mobile device server, and in another embodiment consonance is confirmed by the transaction provider server.

In one embodiment, a user name and/or password is entered on a contactless element in communication with the mobile device, communication with the mobile device encrypted via a secure element with the contactless element. In one embodiment the user device communicates the network address of the user device, and the network address utilized by the user device for communication with the transaction provider server to the mobile device via the contactless element. In yet another embodiment the user device communicates the network address of the user device, and the network address utilized by the user device for communication with the transaction provider server to the mobile device via short range communication such as NFC or infra-red communication.

Independently, a system providing enhanced security for device based transactions is provided, the system comprising: a server associated with a network address; a first device associated with a user, the first device in communication with the server over a first communication channel, the first device requesting a transaction via the server, the first device arranged to obtain the server associated network address, the first communication channel established responsive to the obtained server associated network address; a second device associated with the user, the second device arranged to be in communication with the first device and receive from the first device the obtained server associated network address; and a mobile device server in communication with the second device over a second communication channel, the mobile device server in communication with the server over a third communication channel, the mobile device server arranged to: input the received obtained server associated network address from the second device over the second communication channel; and obtain the server associated network address from a trusted source; and authorize a transaction only in the event that the input received obtained server associated network address is consonant with the server associated network address obtained from the trusted source.

In one embodiment, the trusted source is the server, wherein the server associated network address is obtained form the server over the third communication channel. In another embodiment, the trusted source is a database in communication with the mobile device server.

In one embodiment, the first communication channel is different from the second communication channel. In another embodiment, the first device and the second device are a single device.

In one embodiment, one of the first device and the second device is a user mobile device. In another embodiment, one of the first device and second device the user device is a computer.

In one embodiment, the first device is a computer and the second device is a user mobile device. In another embodiment, the communication of the second device with the first device is over a fourth communication channel, the fourth communication channel different from any of the first, second and third communication channels. In one further embodiment, the fourth communication channel is one of radio frequency identification and near field communication.

In one embodiment, the third communication channel is a secured communication channel different from any of the first and second communication channels. In another embodiment, the system further comprises a secured element arranged to be in communication with the second device, the secured element arranged to provide an encrypted pass code to the mobile device server over the second communication channel responsive to a user gesture.

In one further embodiment, the system further comprises an entry device in communication with the secured element, the pass code provided to the secured element by the user gesture via the entry device. In one yet further embodiment, the entry device is a dedicated entry device. In another yet further embodiment, the system comprises a contactless element, the secured element comprised within the contactless element, the communication between the secured element and the second device responsive to the contactless element.

In one embodiment, the system further comprises a notification server in communication with the mobile device server, wherein the second device has thereon an application, the application responsive to the notification server, the application arranged to provide the network address of the first device and the input received obtained server associated network address. In another embodiment, the system further comprises an additional server in communication with the mobile device server, the additional server arranged to authorize an additional transaction with the first device responsive to the authorization of the transaction between the first device and the server.

In another independent embodiment, a system providing enhanced security for device based transactions is provided, the system comprising: a first server, a second server and a mobile device server; a first device associated with a user, the first device in communication with the first server over a first communication channel, the first device requesting a transaction via the first server; a second device associated with the user, the mobile device server in communication with the second device over a second communication channel, the mobile device server in communication with the first server over a third communication channel, the mobile device server arranged to: input a transaction authorization request from the first server; authenticate the second device over the second communication channel; authorize a transaction between the first device and the first server responsive to the second device authentication; input a transaction authorization request from the second server. the second server in communication with one of the first and second devices associated the user; and authorize the transaction authorization request from the second server responsive to the authorization of the transaction between the first device and the first server.

In one embodiment, the second server is arranged to authorize an additional transaction with device associated the user responsive to a transactions authorization history between the first device and the first server. In another embodiment, the first device and the second device are a single device.

In one independent embodiment, a system providing enhanced security for device based transactions is provided, the system comprising: a server associated with a network address; a first device associated with a user, the first device in communication with the server over a first communication channel, the first device requesting a transaction via the server, the first device arranged to obtain the server associated network address, the communication over the first communication channel established responsive to the obtained server associated network address; a second device associated with the user, the second device arranged to be in communication with the first device and receive from the first device the obtained server associated network address; and a mobile device server in communication with the second device over a second communication channel, the mobile device server in communication with the server via a third communication channel, at least one of the server and the mobile device server arranged to: obtain the server associated network address from a trusted source; input the received obtained server associated network address from the second device over the second communication channel; and authorize a transaction only in the event that the input received obtained server associated network address is consonant with the server associated network address obtained from the trusted source.

In another independent embodiment, a method of providing enhanced security for device based transactions is provided, the method comprising: providing a first user device; obtaining a server associated network address; establishing communication between the first user device and the server responsive to the obtained server associated network address over a first communication channel; inputting the obtained server associated network address over a second communication channel, obtaining the server associated network address from a trusted source; comparing the server associated network address obtained from the trusted source with the input obtained server associated network address; and authorizing a transaction associated with the server only in the event that the server associated network address input over the second communication channel is consonant with the server associated network address obtained from the trusted source.

In one embodiment, the first communication channel is different from the second communication channel. In another embodiment, the trusted source comprises one of a third communication channel different from the first and second communication channels and a secure database.

In one embodiment, the method further comprises: providing a second user device, the provided second user device received the obtained server associated network address from the first user device, wherein the input obtained server associated network address is communicated by the provided second user device over the second communication channel. In one further embodiment, the provided second user device receives the obtained server associated network address from the first user device via a contactless element.

In another embodiment, the method further comprises: encrypting a pass code; and transmitting the encrypted pass code over the second communication channel. In one further embodiment, the method further comprises: providing an entry device, the pass code received responsive to a the user gesture via the entry device.

In one embodiment, the method further comprises: providing an additional server; authorizing an additional transaction associated with the provided additional server responsive to the authorization of the transaction associated with the server.

In one independent embodiment, a system providing enhanced security for device based transactions is provided, the system comprising: a server associated with a digital fingerprint; a first device associated with a user, the first device in communication with the server over a first communication channel, the first device requesting a transaction via the server, the first device arranged to obtain the server associated digital fingerprint; a second device associated with the user, the second device arranged to be in communication with the first device and receive from the first device the obtained server associated digital fingerprint; and a mobile device server in communication with the second device over a second communication channel, the mobile device server in communication with the server over a third communication channel, the mobile device server arranged to: input the received obtained server associated digital fingerprint from the second device over the second communication channel; and obtain the server associated digital fingerprint from a trusted source; and authorize a transaction only in the event that the input received obtained server associated digital fingerprint is consonant with the server associated digital fingerprint obtained from the trusted source.

In one embodiment, the digital fingerprint is a digital signature. In another embodiment, the digital fingerprint comprises server dynamic information.

Additional features and advantages of the invention will become apparent from the following drawings and description.

BRIEF DESCRIPTION OF DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF EMBODIMENTS

Figure 1A:
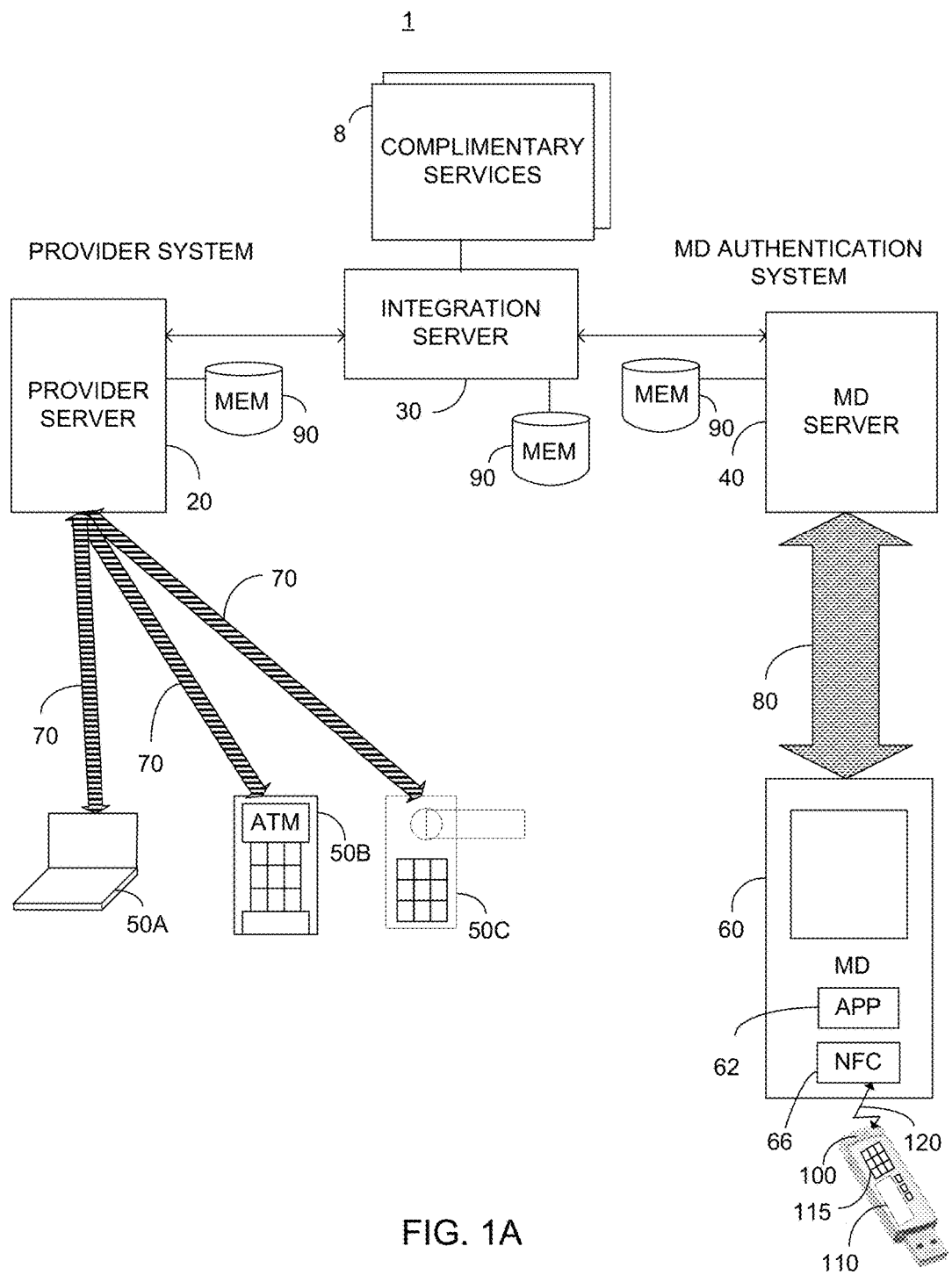
FIG. 1A illustrates a high level block diagram of an embodiment of transaction system providing advantageous partitioning in cooperation with an integration server thereby allowing out of band authentication for use with a provider system.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term connected as used herein is not meant to be limited to a direct connection and includes communication of any sort, and allows for intermediary devices or components without limitation.

In the following description, the term mobile device (MD) includes any electronic mobile device used for personal functionalities such as multimedia playing, data communication over a network or voice communication, including but not limited to a mobile station. For clarity, the term mobile station refers to any mobile communication device, mobile phone, mobile telephone, hand phone, wireless phone, cell phone, cellular phone, cellular telephone, cell telephone, or other electronic device used for mobile voice or data communication over a network of base stations. Although in the following description, communication is described in certain embodiments using an example of cellular communication, particularly, global system for mobile communication (GSM), it will be understood that the scope of the invention is not limited in this respect, and that the communication method used may be based on any suitable communication protocol, including without limitation, Universal Mobile Telecommunications System (UMTS), IEEE 802.11, IEEE 802.16x and CDMA.

The terms "decrypted" and "decoded" are used interchangeably and have the same meaning throughout this document. Similarly, the terms "encrypted" and "encoded" are used interchangeably and have the same meaning throughout this document. The term "transaction" as used herein is meant to include financial transaction as well as logins to various web sites, without limitation.

FIG. 1A illustrates a high level block diagram of an embodiment of transaction system 1 providing advantageous partitioning of prior art authentication methods, including without limitation payment means authentication methods and/or user authentication methods, thereby providing increased flexibility. Transaction system 1 comprises: a provider server 20 in communication with devices which may be any, or all, of devices such as 50A, 50B and 50C, collectively devices 50, the communication provided via provider band 70; an integration server (IS) 30; complimentary services 8 in communication with IS 30; an MD server 40; and an MD 60 preferably running on-board an application 62 on a memory associated with MD 60, application 62 running on a computing device of MD 60. MD 60 further exhibits an NFC communication interface 66. Transaction system 1 further comprises a contactless element (CE) 100, illustrated without limitation as a USB dongle, having embedded therein a secured element (SE) 110 which in one embodiment comprises a keypad 115, a screen and function buttons. MD 60 may further comprise an SE 110 (not shown) without exceeding the scope. Communication between NFC reader 66 and CE 100 is over an NFC band 120.

Communication between MD server 40 and MD 60 is provided via customer band 80, which is typically separate and distinct from provider band 70. Each of provider sever 20, IS 30 and MD server 40 has associated therewith a memory 90 for storing data and operating instructions as required, and each further exhibits a processor for performing the method described herein and providing services. Memory 90 may be internal or external of the associated device without limitation. In one non-limiting embodiment, provider sever 20, IS 30 and MD server 40 are implemented in a single server.

Provider server 20 implements a provider system known to the prior art, arranged to provide services to a user via a device 50, such a computer 50A, an ATM 50B; and a gate 50C. MD server 40 implements an MD authentication system known to the prior art for providing financial services, such as login and purchases, via MD 60 in cooperation with application 62 and preferably with SE 110. In one embodiment SE 110 is provided incorporated within MD 60 and in another embodiment SE 110 is provided incorporated within a CE 100 without limitations. Provider server 20 further provides advanced features as will be described further below in cooperation with IS 30.

Authentication between provider server 20 and the various devices 50 according to the prior art is proprietary, and effort must be continuously maintained to prevent fraud. The arrangement of provider server 20 and the various devices 50 via provider band 70 is known as a provider system. Provider server 20 is in bi-directional communication with each user device 50 via provider band 70, illustrated as a horizontally hatched bi-directional arrow, which may be implemented via the Internet. Further, the horizontally hatched bi-directional arrow represents a bi-directional communication session. In an exemplary embodiment communication via provider band 70 is provided utilizing addresses.

Authentication between MD server 40 and MD 60 according to the prior art is proprietary, and effort must be continuously maintained to prevent fraud. MD 60 is typically constrained to a limited number of MD servers 40 which according to the prior art each have their respective applications stored on MD 60, and thus MD 60 is unable to freely select an MD server 40 without a propriety and cumbersome installation process involving security precautions. The arrangement of MD server 40 and MD 60 via customer band 80 is known as an MD authentication system. Application 62 is commonly known as a "mobile wallet". Customer band 80 is illustrated as a dot filled bi-directional arrow, and may be implemented via a data connection between MD 60 and MD server 40, such a wireless LAN or an IEEE 802.11 compatible connection. Further, the dot filled bi-directional arrow represents a bi-directional communication session which in an exemplary embodiment is provided utilizing addresses. MD server 40, as described herein, further provides advanced features as will be described further below in cooperation with IS 30.

IS 30 advantageously, and innovatively, provides linkage between the provider system and the MD authentication system, as will be described further hereinto below. In particular, IS 30 is in bidirectional communication with each of provider server 20 and MD server 40 to provide enhanced services while maintaining prior art partitioning.

Such partitioning, in cooperation with IS 30, advantageously provides integration with prior art authentication protocols and enhances the experience of an MD 60 based user, while increasing the provider's service ubiquity, strengthening security and contributing to cost saving. Transaction system 1 is an open system as it may support one or more MD servers 40, thus provider server 20 is not dependent on a predefined and pre-integrated set of authentication vendors. Further, transaction system 1 may support multiple provider servers 20 and multiple users MD's 60 with at least one MD authentication system 40. MD server 40 preferably provides a single sign on to all provider servers 20 and thus transaction system 1 may exhibit one MD server 40 for multiple provider servers 20.

In operation, IS 30 provides integration between provider server 20 and MD server 40; in particular, and as described below, IS 30 enables MD server 40 to provide authentication for provider server 20 to thus enable provider server 20 to provide a service to device 50. Advanced security is preferably provided by CE 100 in communication with NFC communication interface 66.

In some further detail, provider server 20 is in bi-directional communication with user device 50 via provider band 70, which may be implemented via the Internet; and may be embodied in one of many systems such as an online banking system where the device 50 may be embodied by user PC 50A or an ATM 50B, embodied in a vending machine system and/or access control system such as gate 50C. Provider server 20, according to the prior art, comprises internal authentication methods, typically based on presentation of credentials by a user at device 50, such as a magnetic credit card acceptance apparatus. Furthermore, a user identification or password may be required to be entered at a data entry device of device 50. However, as indicated above, the requirement to provide credentials, particularly including the use of a user ID and password exposes the user to fraud attacks such as key logger software surreptitiously loaded onto device 50. As will be described further below, the operation of IS 30 enables secure provision of services from provider server 20 to user device 50 without the need for the provision of highly confidential credentials at device 50.

Instead, a significantly lower level of identification is utilized within provider band 70, one which, if compromised, causes significantly less damage than the compromise of a highly confidential credential. For example, compromise of the lower level identification may result in harassment damage; however no direct financial damage can be caused. Such identification will be referred to herein as an unsecured identification, since compromise of the unsecured identification causes minimal damage. The unsecured identification leads transaction system 1 to a secure user authentication. In one embodiment provider server 20 may be in communication with a plurality of ISs 30 without limitation. In certain embodiments, the provision of the unsecured ID to provider server 20 via device 50 is done via one or more of: entry of data on a keypad, voice identification, or by reading short range radio based information such as RFID, NFC, Bluetooth, I.R, or the reading of a Barcode, without limitation.

MD server 40 provides an authentication service, including at least request for authentication from a user of MD 60 and the authentication of any received response. Authentication by MD server 40 is accomplished in cooperation with the user's MD 60 and may include one or more authentication factors and out of band authentication. Optionally, MD 60 include an SE (not shown) having security software installed thereon which contributes to the increased security level achieved by transaction system 1 as be described further below.

IS 30 enables transaction system 1 to act as an open system which allows a user to be authenticated by more than one MD server 40 without limitation. In one embodiment, user MD 60 comprises a plurality of applications 62, each of the plurality of MD servers 40 arranged to perform authentication responsive to communication with a particular application 62. In another embodiment, the plurality of MD servers 40 are arranged to perform authentication responsive to communication with a single application 62 without limitation. Transaction system 1 provides a supplemental user authentication service to provider server 20 in cooperation with one or more MD server 40, as will be described further. Complementary services 8, in communication with IS 30, supply enhanced services for IS 30 such as coupons or advertisement services. In one embodiment IS 30 is embedded in MD server 40, and in another embodiment both provider server 20 and IS 30 are embedded in MD server 40. Transaction system 1 is preferably arranged to perform enhanced transaction security irrespective of the protocol used by provider server 20 in cooperation with device 50 to capture a user's unsecured identification. Integration server 30 may be programmed to select at least one of a plurality of MD servers 40 responsive to one of multiple parameters including user pre-configuration, pre-transaction time indication originating from a user application 62 and provider server 20 preferences.

An authentication request originated by provider server 20 to IS 30 may include the desired authentication type and transaction information to assist the authentication process. Such transaction information advantageously may comprise location information regarding device 50 which is preferably confirmed as consonant with location information for MD 60 physical location by MD server 40. The term consonant with, as used in the context of location information, as used herein, does not require an exact location match, but instead is indicative of a location match within a pre-determined range, which preferably takes into account location determining errors, the amount of which errors may be further location dependent.

Authentication type may comprise any or all of: a user authenticity indication, which may include something the user has; something the user knows; where the user is located; parties with whom the user is in communication; authentication risk score; payment authentication; user history; user details; and MD 60 details, without limitation. In one embodiment provider server 20 may request the user to enter a password associated with provider server 20 on MD 60 as part of the authentication process. Authentication is herein further supported by CE 100 having thereon SE 110.

As indicated above, each of provider server 20, IS 30 and MD server 40 exhibits a processor and, as indicated above, are in communication with a memory 90 which may be internal or external without exceeding the scope. Memory 90 exhibits a non-transitory computer readable medium upon which instructions for operation of the respective provider server 20, IS 30 and MD server 40, as described below, are stored. Memory 90 may be further utilized to provide storage of data as required. There is no requirement that the various memories 90 be physically disparate, and the various memories 90 may be implemented on a single cloud server without exceeding the scope.

Figure 1B:
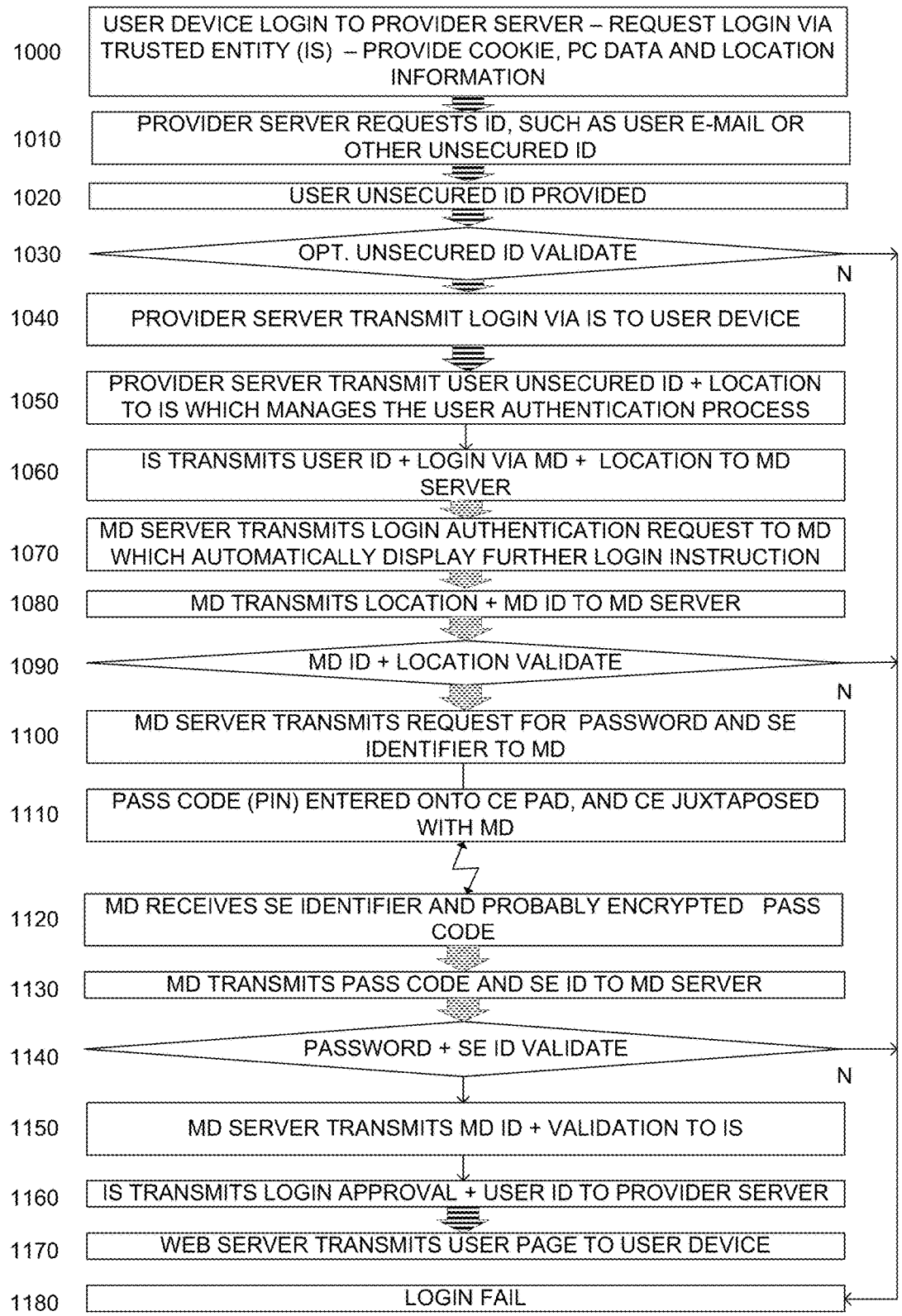
FIG. 1B illustrates a high level flow chart of an exemplary embodiment of the operation of the transaction systems of FIG. 1A to provide secure login facilities to a user device without passing a private username or a password over the provider band.

FIG. 1B illustrates a high level flow chart of an exemplary embodiment of the operation of transaction system 1 to provide secure login facilities to user device 50A without passing a private username or a password over provider band 70. Such an embodiment is particularly useful when user device 50A is not solely the property of the user, such as a personal computer (PC) at an Internet café, however this is not meant to be limiting in any way. For clarity, the flow between stages are marked in a manner consonant with the band information of FIG. 1A, and thus flows within provider band 70 are shown as a horizontally hatched arrow, flows within customer band 80 are shown as a dot filled arrow and flows between IS 30 and either provider server 20 or MD server 40 are shown as solid lines. Particular stages are performed responsive to instructions stored on the respective memory 90, as described above. It is to be noted that this flow may apply to further exemplary embodiments such as transaction authentication for transactions performed after initial login, with the appropriate adaptations. The flow will be described in particular in relation to user device 50A, however this is not meant to be limiting in any way. A similar flow is equally applicable to user device 50B and 50C, without limitation.

In stage 1000, user device 50A accesses a particular resource, page or site of a provider server 20 via provided band 70, and requests transaction approval, such as a login approval, which will be further explained herein, for a user by trusted IS 30 via user MD 60. There is no limitation that login approval be via user MD 60, and any authorization agreed between provider 20 and IS 30 which is based on information collected by IS 30, such as user authentication by at least one other trusted entity in a predetermined time before the authentication request, may be utilized without exceeding the scope. In the interest of clarity, authorization via user MD 60 will be further detailed below, strictly as a non-limiting example. Optionally, an initial login page provided by provider server 20 to user device 50A exhibits a quick OOBL logo, which notifies the user that upon selection login is to be approved by a trusted entity, and the trusted entity may request that the user complete login through user MD 60. The OOBL logo is illustrated on a display portion of user device 50A for clarity. Alternately, login is constrained to be via OOBL for certain transactions. User device 50A preferably provides stored cookie information identifying user device 50A on a local memory. Optionally, the provided cookie information comprises computer identifying information, such as serial numbers or other configuration data. Provider server 20 preferably determines location information of user device 50, optionally responsive to an Internet protocol address of user device 50. The particular page or site of provider server 20 may be associated with a financial institution, merchant or service supplier without limitation.

In stage 1010 provider server 20 requests a user ID from user device 50A, preferably a user unsecured ID which may be any ID the user chooses without limitation which is registered at least with IS 30 or with MD server 40. In an exemplary embodiment an e-mail address is utilized as a user unsecured ID, in another embodiment a phone number, such as an MSISDN of user MD 60, is utilized as a user unsecured ID. It is to be understood, that pre-registration with IS 30 associating the user unsecured ID with at least one MD server 40 which is further associated with a user MD 60 is preferably performed at a pre-registration stage, wherein a username and password, preferably different from the user unsecured ID, are defined and stored in a portion of memory 90 accessible by MD server 40 associated with the user unsecured ID. Pre-registration is further utilized to associate one or more identifiers of SE 110, and/or encryption keys of SE 110, with the user unsecured ID.

In stage 1020, responsive to the request of stage 1010, a user supplies the user unsecured ID via user device 50A. In optional stage 1030 the user unsecured ID supplied is validated against the predefined user unsecured IDs stored in the memory accessible by provider server 20A described above. Multiple complementary parameters may be applied to the validation procedure such as validation time and user device 50A location. In the event that the user unsecured ID is not validated, in stage 1180 a login fail message is generated, and displayed on a display device of user device 50A.

In stage 1040, a "login via Trusted IS" message, or more particular instructions such as "login via user MD", is transmitted by provider server 20 to user device 50A and displayed on a display device of user device 50A, thus in one embodiment prompting the user to continue the login on user MD 60 which will preferably automatically display further login instruction as described in stage 1070 below. In an alternative embodiment, IS 30 requests that MD server 40 issue a challenge to user MD 60 without user interference, and only if successful proceed with the login instructions.

In stage 1050, the user unsecured ID of stage 1020, and the optional determined location information of stage 1000 is transmitted as an authentication request by provider server 20 to IS 30. IS 30 manages authentication requests in according with pre-determined risk rules negotiated between provider server 20 and IS 30, and responsive to the pre-determined risk rules determines whether to directly authorize the user login, as described below in relation to stage 1160, or to proceed with a login via user MD 60 as will be described below beginning in relation to stage 1060 below.

In stage 1060, IS 30 transmits a login via MD request to MD server 40 including the user unsecured ID of stage 1020, and the optional determined parameters such as location information of stage 1000.

In stage 1070, MD server 40 transmits a login authentication request to MD 60 which preferably triggers user MD 60 application 62 to automatically display further login instructions on a display device of user MD 60. Alternately, a user may initiate MD application 62 to display further login instructions. In one embodiment, MD server 40 triggers application 62 via a notification server (not shown) without user intervention.

In stage 1080, responsive to authentication request from MD server 40 on stage 1070, MD 60 provides to MD server 40 location information and an identifier of user MD 60, which may be the MSISDN or other identifier or other group of identifiers unique to user MD 60 such as a cookie, an IMSI, an IMEI, or a BT ID, without limitation, and are verifiable by MD server 40. Preferably, application 62 run on user MD 60, and stored on a local memory of user MD 60, performs the access to MD server 40 and provides the above mentioned datum. Further preferably, information transmission between user MD 60 and MD server 40 is via a secure sockets layer (SSL) link.

In stage 1090, MD server 40 compares the received user MD 60 identifier and location information with all pending login authentication requests transactions, to find a consonant pending login transaction, as described above in relation to stages 1040-1060. It is to be understood, that as described above, memory 90 of MD server 40 comprises a cross reference of user IDs, as described above in relation to stage 1010, and user MD 60 identifiers, so as to determine if any user ID of a pending transaction is consonant with, i.e. cross-referenced with, a received user MD 60 identifier. Location information is further preferably compared for consonance to prevent against fraud. As indicated above, there is no requirement that location information consonance be exact, particularly since location information of user MD 60 may be provided by triangulation which does not provide pin-point accuracy, and location information of user device 50 may be similarly supplied by IP address which does not supply pin-point accuracy. Thus, a broad definition of location consonance is preferably utilized, such that only location inconsonance which is not physically possible is set to trigger a non-consonant outcome. Optionally, the location filter may be bypassed without exceeding the scope. Consonance of identifiers is however precise, and is meant to include any cross-referencing. Thus, an identifier which is received, may be consonant with a stored identifier is after translation, decryption, or cross-reference, it matches the stored identifier.

In the event that in stage 1090 a user MD 60 identifier and location information is consonant with a pending login transaction, in stage 1100 MD server 40 requests pass code information and identifier of SE 110 from user MD 60. Optionally, in order to strengthen the something you have security factor, MD server 40 performs an SMS challenge to user MD 60 (not shown). In further detail, MD server 40 may transmit an SMS message to user MD 60, optionally comprising an alphanumeric code, and the application running of user MD 60 described above responds to the SMS challenge, preferably by returning the received alphanumeric code. The above SMS challenge and response is known to those skilled in the art of mobile financial transactions and thus in the interest of brevity is not further detailed herein.

In stage 1110, the user enters a pass code, such as a PIN, onto input device 115 of CE 100, and juxtaposes CE 100 with MD 60. Alternately, both the user name and password may be entered on an input device of user MD 60 without exceeding the scope. Responsive to a user input gesture onto an input device of MD 60, or the juxtaposition of CE 100 with NFC communication interface 66, in stage 1120 user MD 60 receives the pass code, preferably encrypted by a key of SE 110, and an identifier of SE 110, via NFC band 120. In stage 1130 MD 60 transmits the received identifier and pass code to MD server 40. The transmission may be further encoded by an optional SE 100 on-board MD 60 without exceeding the scope. The username, password and SE identifier are in one embodiment pre-registered with MD server 40, and thus may be validated by MD server 40 without communication with provider server 20. In an alternative embodiment, the username and password are registered with IS 30, or with provider server 20, without limitation, and validation is performed by the appropriate server. In an alternative embodiment a username is not requested, and only a password and preferably an SE 110 identifier is requested from the user. In one embodiment, the username and password are transmitted from user MD 60 encoded responsive to information responsive to part of the optional SMS challenge. Additionally information from user MD 60 may be similarly encoded without limitation.

In stage 1140 the received username, password and SE ID are validated to confirm that it is consonant with a stored username, password and SE ID on MD server 40. In the event that the received username and password is validated, in stage 1150 MD server 40 transmits to user MD 60 a message, such as "login completed, continue via user device", and MS server 40 further transmits an authorization to IS 30 to allow login to provider server 20 responsive to the transmitted username and password of stage 1130. The validation message preferably is matched with the pending transaction of stage 1000 via the MD 60 identifier, which is transmitted as part of the validation message.

In stage 1160 IS 30 transmits an authentication message to provider server 20 including an indication of the authentication method utilized to identify the user, an identifier of user MD 60 and a confirmation code for validation.

In stage 1170 provider server 20, responsive to the received authentication message of stage 1160, transmits the desired user page to user device 50A. It is to be noted that username and password information has not been transmitted in provider band 70, and has been exclusively transmitted within customer band 80, thereby improving security.

In the event that in stage 1030 unsecured ID validation fails, or in the event that in stage 1090 user MD 60 and location consonance fails, or in the event that in stage 1140 username and password validation fail, in stage 1180 the login attempt fails. Preferably, notification of login failure is transmitted to both user MD 60 and user device 50A.

In one embodiment the login authentication on user device 50A via MD 60 may start by a user actively starting or logging in by MD application 62 to MD server 40 prior to stage 1020.

The transaction flow of FIG. 1B thus provides 3 Band isolation: a provider band, an issuer band and a separate NFC band arranged to read SE 110. Furthermore security is enhanced by the provision of a second "something that you have", i.e. an identifier of SE 110. Security is further enhanced by the password which is preferably entered on a secured keypad, encrypted and therefore blocked from access by surreptitious key logger software, and which represents "something that you know", and additionally by the use of location confirmation thus adding "where you are".

The above is not meant to be limiting in any way to a single fixed ID from SE 110, and SE 110 may be supplied with a pseudo-random number generator based on a key pre-registered with one of MD server 40 and IS 30. Thus, a one time password (OTP) may be further provided from SE 110 and validated as part of the transaction flow of FIG. 1B without exceeding the scope. Preferably, the OTP is provided with an expiration time to user MD 60 over NFC band 120.

Security may be additionally enhanced utilizing other measures, such as image selection without exceeding the scope.

Figure 1C:
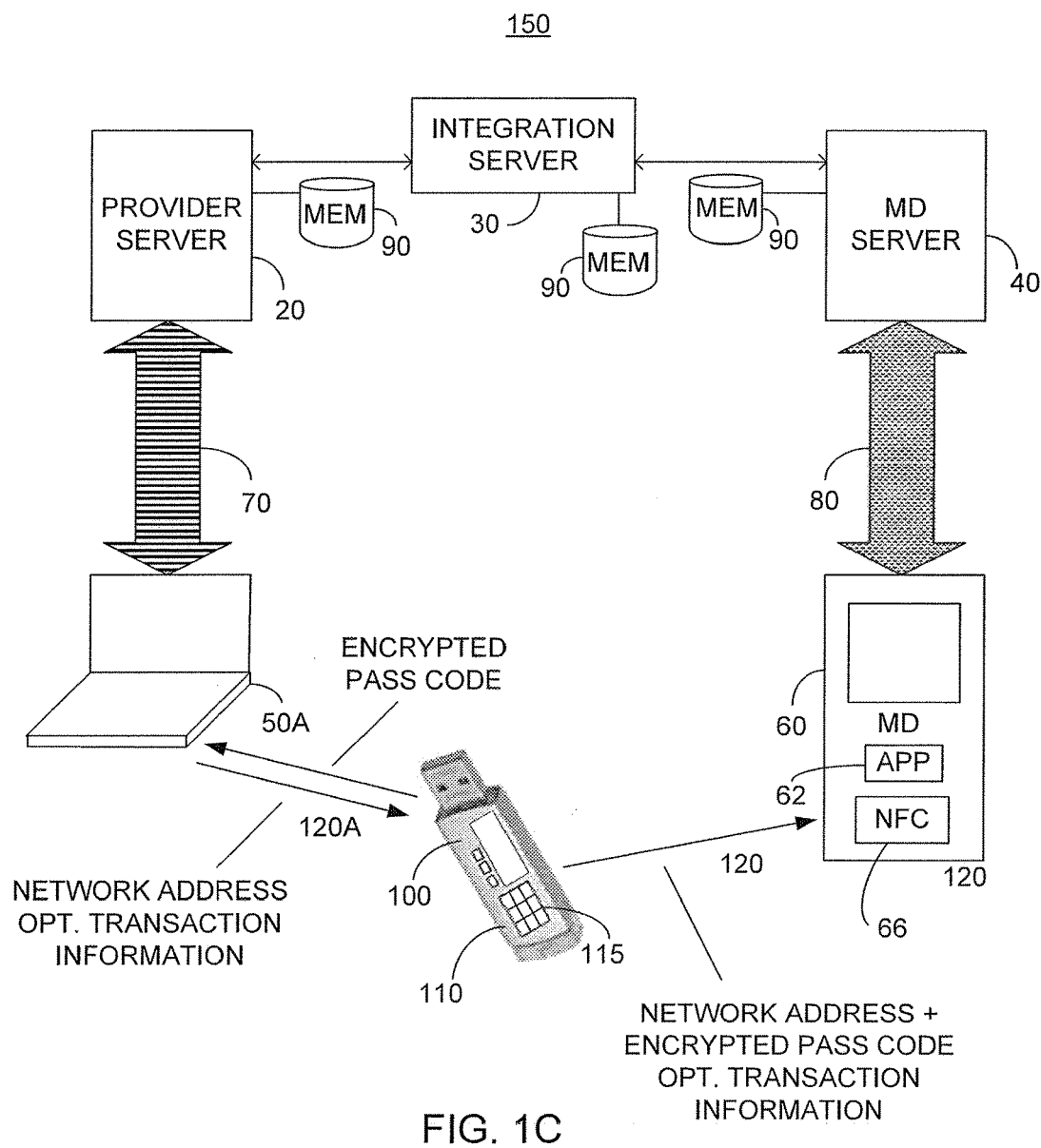
FIG. 1C illustrates a high level block diagram of an embodiment of transaction system providing advantageous partitioning in cooperation with an integration server, and further providing enhanced security via an NFC based device.

FIG. 1C illustrates a high level block diagram of an embodiment of a transaction system 150 providing advantageous partitioning in cooperation with an integration server 30, and further providing enhanced security via CE 100. Transaction system 150 is in all respects identical to transaction system 1, with the exception that only user device 50A, illustrated without limitation as a portable computer is illustrated for clarity. Furthermore, CE 100 is arranged to communicate with both MD 60 and user device 50A. In one embodiment, CE 100 is arranged in a USB format, thus enabling quick connection with user device 50A. In another embodiment, user device 50A is provided with NFC or other short range communication capability to enable the flow of operation to be described further below in relation to FIG. 1D.

Figure 1D:
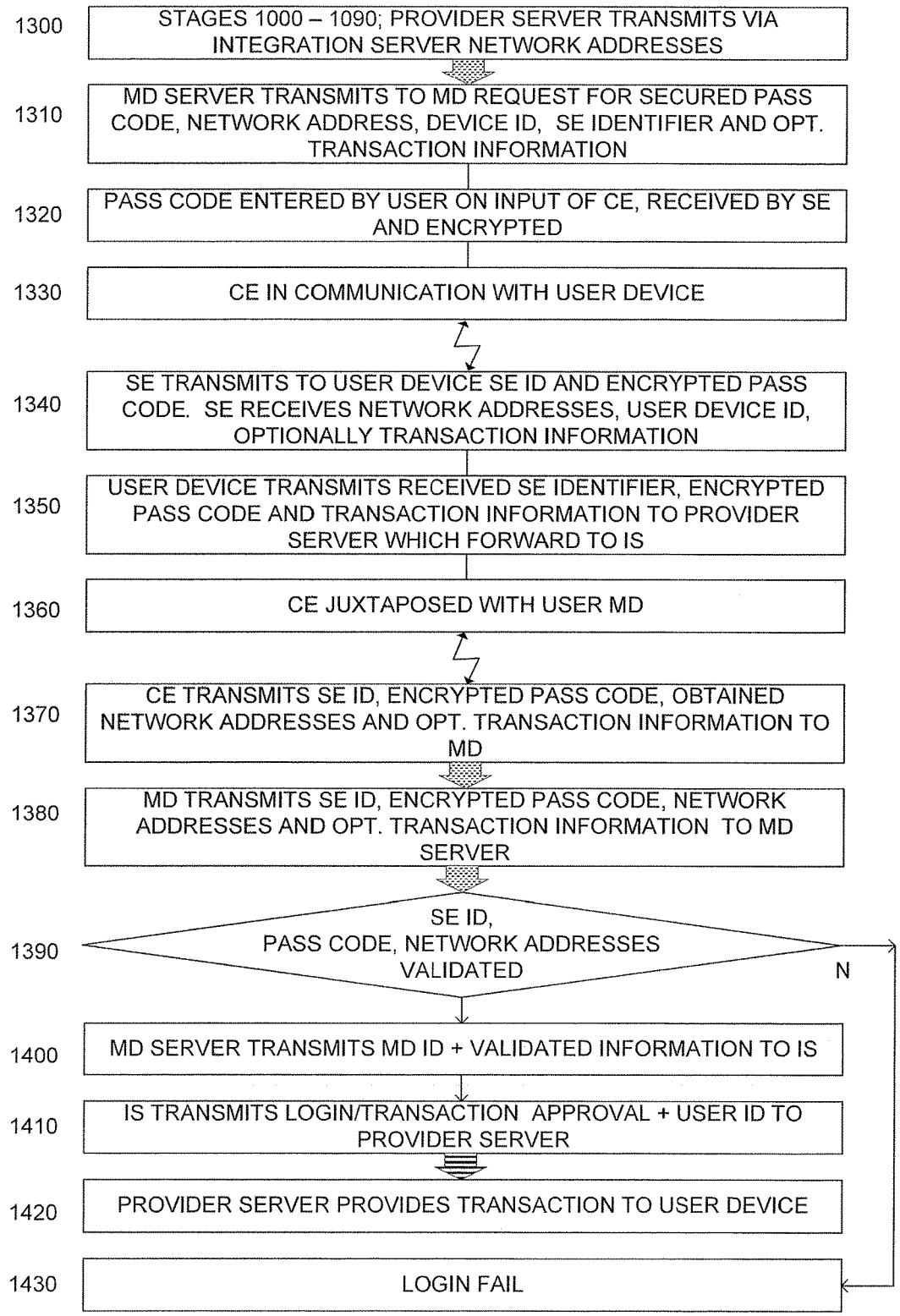
FIG. 1D illustrates a high level flow chart of an exemplary embodiment of the operation of the transaction system of FIG. 1C to provide secure login facilities to a user device without typing a private username or a password on the MD key pad.

FIG. 1D illustrates a high level flow chart of an exemplary embodiment of the operation of transaction systems 150 to provide secure login facilities to user device 50A without typing a private username or a password on the key pad of user MD 60. Furthermore, additional security is provided responsive to network address information, provided via NFC band 120 and/or a plug in and/or NFC band 120A as will be described further below.

In stage 1300, stages 1000-1090 of FIG. 1B, as described above, are performed. Preferably, provider server 20 provides information regarding the network address used by it, as well as the network address which leads to user device 50A for verification, as will be described further below. In stage 1310, MD server 40 transmits a request to user MD 60 for a secure password, a network address, an SE identifier and optionally transaction information to be utilized for the pending login transaction of stage 1000.

In stage 1320, a user input gesture is received at keypad 115 of CE 100, thereby receiving the pass code, such as a PIN. The pass code is received by SE 110, preferably encrypted and stored in a local memory.

In stage 1330, CE 100 is placed in communication with user device 50A. In one embodiment, CE 100 is plugged into a respective USB (Universal Serial Bus) port of user device 50A, and in another embodiment CE 100 is juxtaposed with a respective NFC communication device of user device 50A. In yet another embodiment, CE 100 is in Bluetooth or Infra-red communication with user device 50A. Responsive to being placed in communication with user device 50A, in stage 1340 SE 110 transmits the encrypted pass code to user device 50A, along with an identifier of SE 110. Thus, the pass code is not entered onto user device 50A and can not be intercepted by key logging software. CE 100 is a dedicated device which does not run general software, and it therefore not susceptible to key logging software. User device 50A transmits to CE 100 a list of network addresses in which it is in communication with, the list at least comprises the address utilized to connect with provider server 20 and the address of user device 50A. Such a list is available from a processor of user device 50A, as is known to those skilled in the art. User device 50A further transmits to CE 100 an identifier of user device 50A, and optionally further communicates transaction information. The bidirectional communication between user device 50A and CE 100 is over NFC or USB band 120A as shown in FIG. 1C.

In stage 1350 user device 50A transmits the received SE identifier, encrypted pass code and transaction information to provider server 20, which in an exemplary embodiment is a web server. Provider server 20 forwards the received information to integration server 30.

In stage 1360, CE 100 is juxtaposed with MD 60, and in stage 1370 CE 100 transmits an identifier of SE 110, the encrypted pass code, network addresses obtained from user device 50A and optional transaction information to MD 60, particularly to application 62, via NFC communication interface 66, i.e. over NFC band 120. There is no requirement that CE 100 be disconnected from user device 50A, however connection with user device 50A is not required.

In stage 1380 the received SE 110 identifier, encrypted pass code, network addresses and optional transaction information is transmitted from MD 60 to MD server 40 via customer band 80. The transmission may be further encoded by an optional SE 110 on-board MD 60 without exceeding the scope. Additionally, user MD 60 preferably transmits an identifier of user MD 60 to MD server 40.

In stage 1390, the received pass code and SE ID are validated to confirm that it is consonant with a stored pass code and SE ID on MD server 40. Furthermore the received addresses are validated as consonant with the received addresses of stage 1000. The term consonant in such a context means that the comparison takes into account and re-addressing or forwarding authorized by provider server 20. In the event that the received SE ID, pass code and addresses are validated, in stage 1400 MD server 40 transmits the received identifier of user MD 60, or a mapped equivalent known to provider server 20, with validation information, such as a digital signature to IS 30.

In stage 1410, IS 30 transmits an authentication message to provider server 20 including an indication of the authentication method utilized to identify the user, the received identifier of stage 1000 for matching with the open transaction request of stage 1000 and a confirmation code for validation.

In stage 1420 provider server 20, responsive to the received authentication message of stage 1410, transmits the desired user page to user device 50A, or allows the desired transaction. It is to be noted that password information that was transmitted in provider band 70 was encrypted by CE 100, and has been transmitted encrypted within customer band 80, thereby greatly improving security. Additionally, no information has been entered on the keypad of MD 60 and on device keypad 50A which is susceptible to key stroke logging. Further, man in the middle attacks are prevented by the validation of network addresses.

In the event that in stage 1380 validation fails, in stage 1430 the login attempt fails. Preferably, notification of login failure is transmitted to both user MD 60 and user device 50A.

Figure 1E:
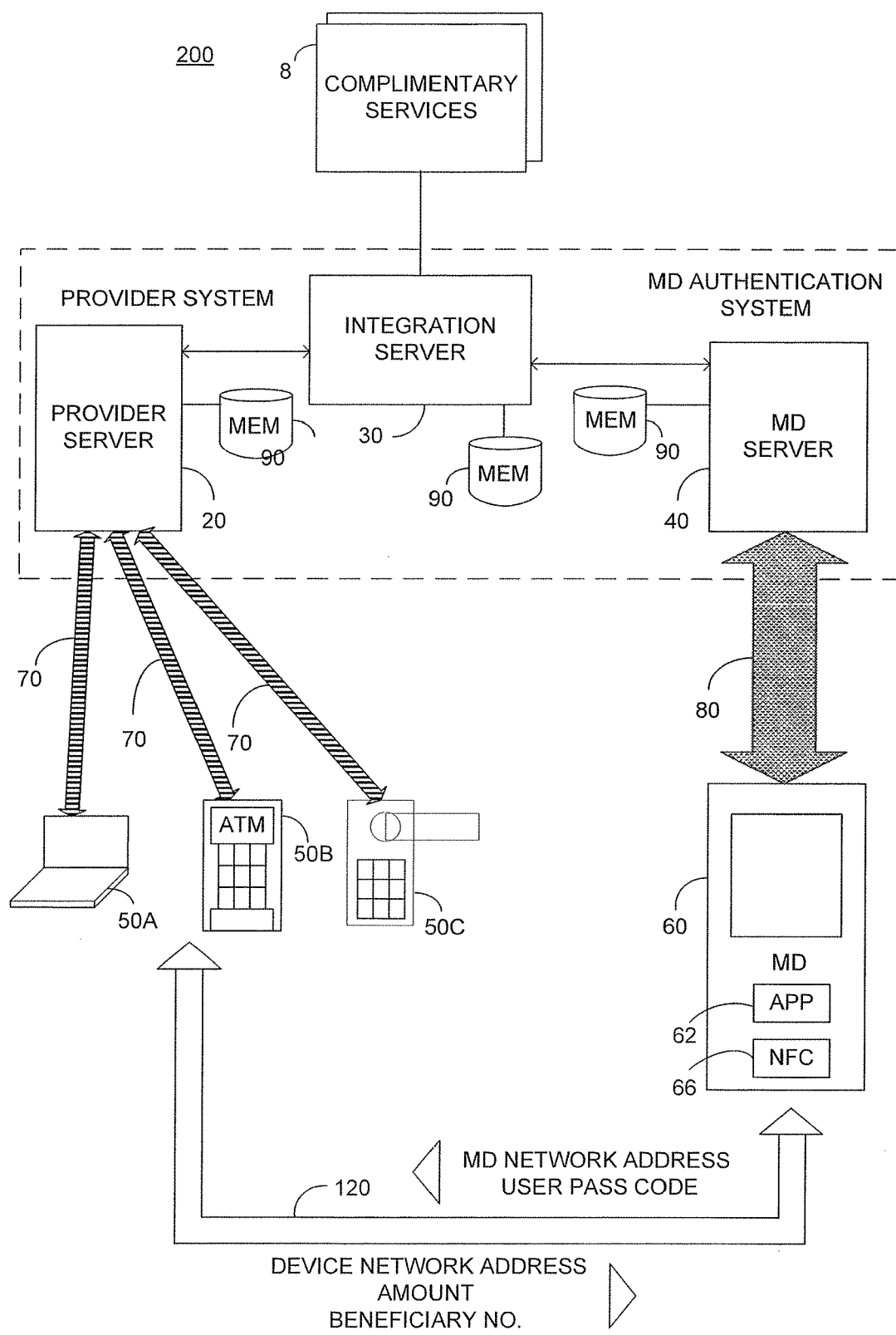
FIG. 1E illustrates a high level block diagram of an embodiment of a transaction system providing advantageous security in cooperation with an integration server, and further providing enhanced security by confirming consonance of network addresses.

FIG. 1E illustrates a high level block diagram of an embodiment of a transaction system 200 providing advantageous security in cooperation with integration server 30, and further providing enhanced security by confirming consonance of network addresses. Transaction system 200 is in all respects similar to transaction system 1, with the exception that communication band 120, which may be provided by an NFC band, a USB band or other short range communication is supplied between the user MD 60 and each of the various devices 50A, 50B, 50C.

In operation, user MD 60 provides to the respective device 50 a list of network addresses used in the present communication and a pass code. The provided pass code optionally encrypted by an on-board SE of MD 60 (not shown). User MD 60 is juxtaposed with the respective device 50, and user MD 60 provides to the respective device 50 the network addresses of user MD 60 and address utilized for communication with MD server 40 via NFC communication interface 66, and optionally the encrypted user passcode. Further responsive to user MD 60 juxtaposed with the respective device 50, the respective device 50 provides user MD 60 with a list of network addresses utilized in communication, transaction amount and beneficiary information, such as a number. Any of IS 30, MD server 40 or provider server 20 may thus be arranged to compare the network addresses of both bands, i.e. bands 70 and 80, and authorize the requested transaction only in the case that the network addresses are consonant with each other.

Thus, in one embodiment, a user logs into ATM 50B via user MD 60, and integration server 30 authorizes the transaction responsive to the network addresses of provider server 20 received from user MD 60 matching the known communication addresses of provider server 20.

Figure 2A:
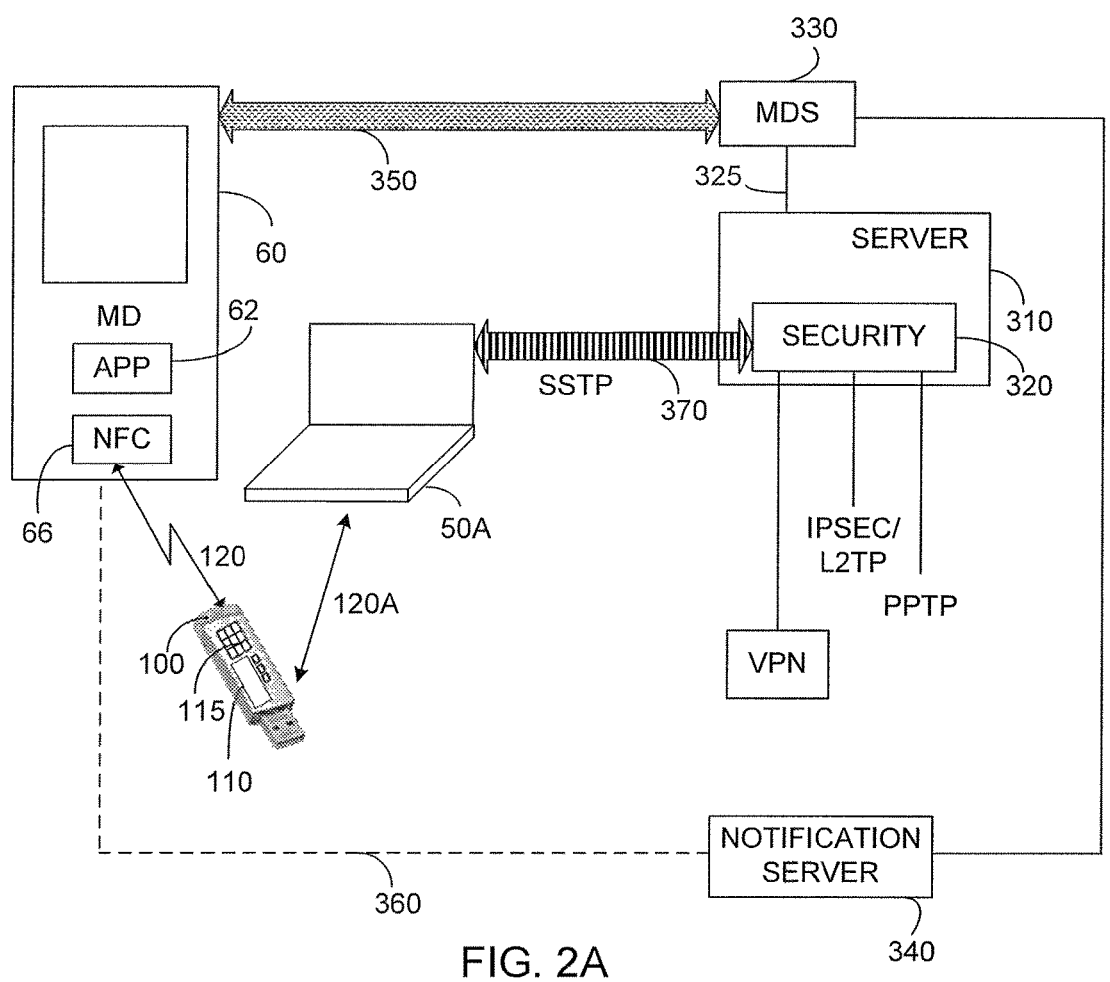
FIG. 2A illustrates a high level block diagram of a system providing improved security for a network communication utilizing two devices.
Figure 2B:
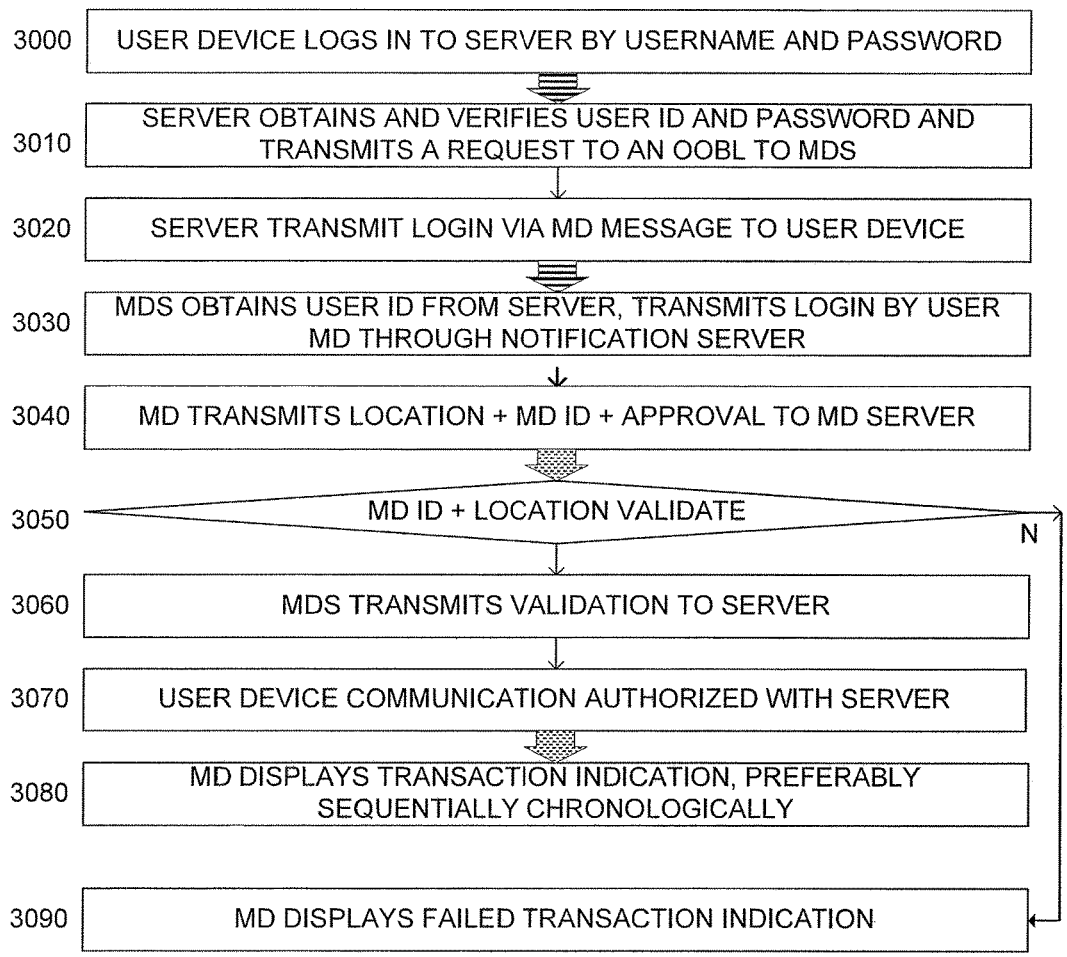
FIG. 2B illustrates a high level flow chart of a first embodiment of the operation of the system of FIG. 2A to provide increased security via out of band login.
Figure 2C:
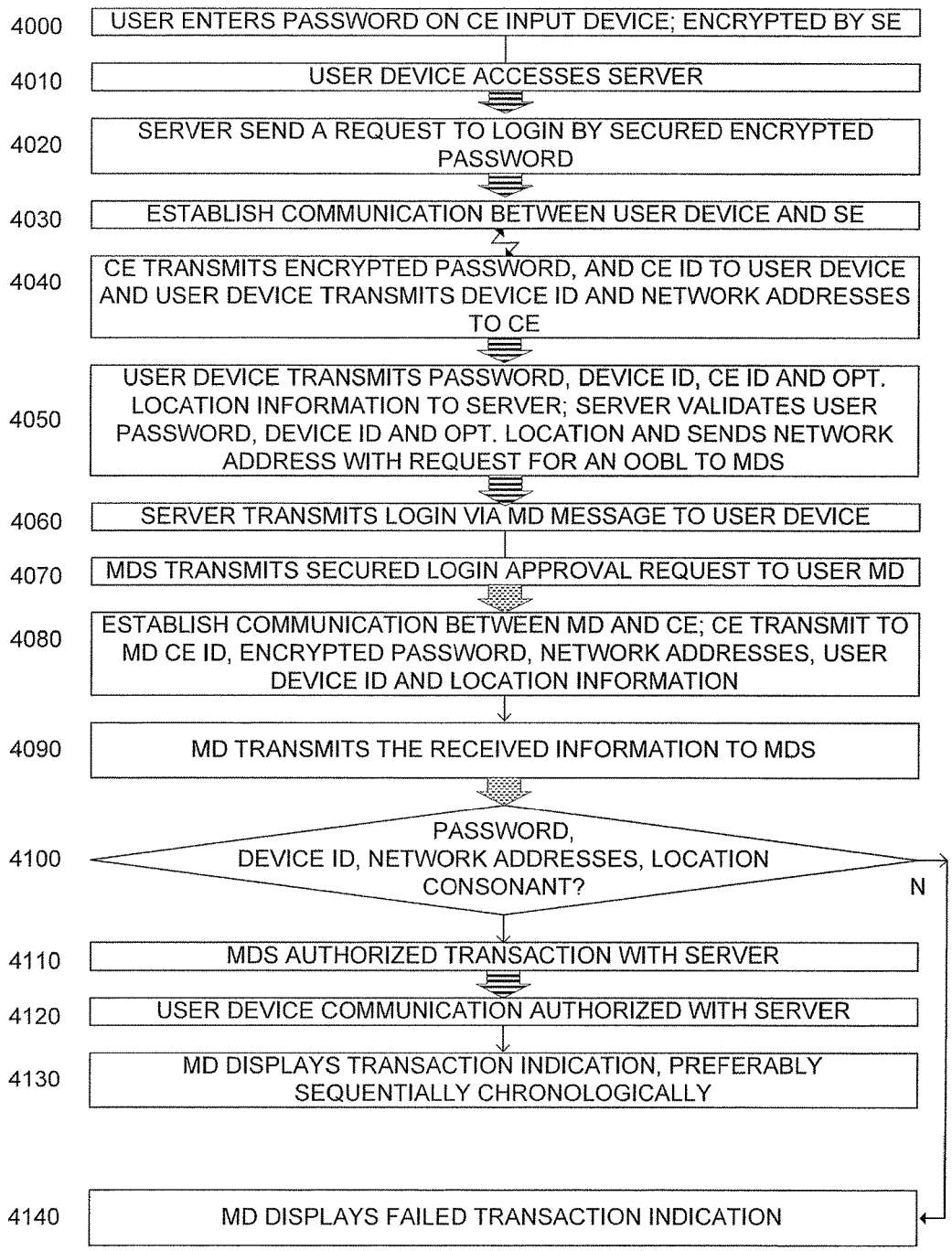
FIG. 2C illustrates a high level flow chart of a second embodiment of the operation of the system of FIG. 2A to provide increased security responsive to an address comparison.

FIG. 2A illustrates a high level block diagram of a system 300 providing improved security for a network communication utilizing two user devices. FIGS. 2B-2C each illustrate a high level flow chart of an embodiment of the operation of system 300, and will be described in further detail below.

System 300 comprises a server 310 comprising therein a security module 320; a mobile device server (MDS) 330; a notification server (NS) 340; a user device 50A, illustrated without limitation as a portable computer; and a user MD 60 having an application 62, an NFC communication interface 66 and in communication with a CE 100 having embedded therein an SE 110, and preferably an input device 115. Communication between NFC communication interface 66 and CE 100 is preferably over an NFC band 120, as described above, and communication between CE 100 and user device 50A is preferably over a USB band 120A. In one embodiment, communication between user MD 60 and user device 50A is via NFC, responsive to the juxtaposing of MD 60 with user device 50A. Communication between MDS 330 and user MD 60 is over a wireless network 350, illustrated as a dot filled bi-directional path, and communication between notification server NS 340 and MD 60 is via a communication path 360, illustrated as a dashed line. Communication between user device 50A and security server 320 is via a secure tunneling or VPN protocol denoted as secure socket tunneling protocol (SSTP) link 370, illustrated as a line filled bi-directional path. Security server 320 provides varying levels of security, including point-to-point tunneling protocol (PPTP) and Internet Protocol Security, Layer 2 Tunneling Protocol (IPSEC/L2TP). Optionally, security server 320 further supports a virtual private network (VPN), however this adds to cost. Unfortunately, a VPN server is costly and although it provides increased security, it is only one ring in the security chain while other parts of the security chain, such as various user devices in communication with the VPN server, are vulnerable to malicious programs thereby the security of the VPN server is compromised. Server 310 is in communication with MDS 330 via a communication link 325, which is in one embodiment a secured communication link, and MDS 330 is in communication with NS 340.

The term band is often used interchangeably with communication paths, and thus 2 independent communication paths is also known as two band communication.

As will be described further below, increased security is provided via multiple band communication. In an exemplary embodiment, address confirmation provides further increased security.

Referring now to FIG. 2B, a first embodiment of operation of system 300 is described. In stage 3000 user device 50A logins to server 310, preferably by providing a user name and password, or pass code. In one embodiment only user identification is provided to server 310. In stage 3010, server 310 verifies the user name and password and requests an out of band login (OOBL) approval request from MDS 330, including user name information, via communication link 325. In stage 3020, server 310 preferably transmits a message to user device 50A indicating that login is to proceed in cooperation with user MD 60.

In stage 3030, MDS 330 responsive to the received user name of stage 3010, transmits, preferably via NS 340, a message to application 62 running on a processor of user MD 60 to mutual authenticate with MDS 330. In one embodiment after the mutual authentication, MDS 330 message further initiates application 62 to show a login screen on a display portion of user MD 60. In another embodiment application 62 responds to the message from NS 340 without notifying the user. In stage 3040, user MD 60 transmits location information, an identifier of user MD 60, such as an MSISDN, and approval code to MDS 330. In the event that application 62 has shown a login screen, preferably a user approval code, pre-registered with one of MDS 330 and server 310 is further transmitted.

In stage 3050, the received identifier of user MD 60 is compared to known identifiers to ensure that the responding user MD 60 is associated with the received login information of stage 3010. Further, received location information is verified to confirm consonance with an expected value. As described above, only physically impossible inconsonance is preferably disallowed.

In the event that in stage 3050 the received ID and location information is validated, in stage 3060 MDS 330 transmits a validation message to server 310. In stage 3070 server 310 authorizes communication between server 310 and user device 50A over one of the links, such as SSTP link 370.

In optional stage 3080, highlights of transactions are transmitted from server 310 to MDS 330, and pushed to user MD 60 onto a display of user MD 60. In one particular embodiment, to ensure security, an indication of the type of transaction being performed by user device 50A is transmitted to user MD 60 and displayed on a display device thereon, preferably chronologically. The indication is preferably displayed in chronological order in relation to other operations done from the beginning of the session, preferably in a graphical symbolized manner for easy user review. In the event that the user of MD 60 notes a discrepancy between operation of MD 60 and the chronological information displayed on user MD 60, an attack is noted and the user may disconnect from server 310. Optionally, a user may request further operation information via MD 60 or by terminating the web session due to suspicion of fraud. In another embodiment the user verifies that there are no indications of operations displayed on MD 60 which are not actually performed by the user of user device of 50A, since these indications can be signs of fraud attack. Preferably, the MD 60 monitoring stays active until the user logs off server 310 by user device 50A or by MD 60.

In the event that in stage 3050 either the identifier of user MD 60 is not validated, or the location information is inconsonance with the expected value, in stage 3090 preferably user MD 60 is sent a message to display that the transaction has failed, and user device 50A is denied login privileges.

Thus, the flow of FIG. 2B provides advanced security between user device 50A and server 310 via OOBL continual out of band supervision.

FIG. 2C illustrates a high level flow chart of a second embodiment of the operation of the system of FIG. 2A to provide increased security responsive to an address comparison and further in cooperation with CE 100. In stage 4000, a password, or pass code, such as a PIN, is entered on entry device 115 of CE 100. Preferably, the entered password is received by SE 110 of CE 100, encrypted by SE 110, and stored in an encrypted format. Encryption by SE 110 is preferably responsive to one or more keys stored on SE 110. In stage 4010, user device 50A, responsive to a user gesture, accesses server 310. In stage 4020, server 310 send a message to user device 50A, which is displayed on a display portion of user device 50A, to login by a secured encrypted password via CE 100.

In stage 4030, communication is established between CE 100 and user device 50A. In one embodiment, communication is established by plugging CE 100 into a USB port of CE 100, and in another embodiment communication is established by juxtaposing CE 100 with an NFC communication interface of user device 50. In yet another embodiment in which SE 110 is embedded within user MD 60 preferably with a provides secured keypad 115, communication is established by juxtaposing user MD 60 with device 50A. Communication between CE 100 and user device 50 is thus over communication link 120, which is a particular communication band. In stage 4040, the encrypted password of stage 4000 is transmitted to user device 50A over communication band 120A. An identifier of SE 110, known as an SE ID is further transmitted to user device 50A over communication band 120A. User device 50A transmits an identifier of user device 50A and a list of active network addresses currently in use to CE 100, and further optionally transmits location information. Such a list of active network addresses includes local addresses, i.e. network addresses currently associated with user device 50A and foreign addresses, i.e. addresses with which user device 50A is currently in communication with. In one embodiment the encrypted password of stage 4000 is not transmitted to user device 50A over communication band 120A, but is instead only transmitted to MD 60 as will be described further.

In stage 4050, user device 50A transmits to server 310 the received encrypted password of stage 4040, the received CE ID of stage 4040, the identifier of user device 50A, and optional location information to server 310. Server 310 validates the received information to the extent possible, such as by decrypting the received encrypted password and confirming it's validity. Server 310 further sends its associated network address, received identifier of user device 50A, SE ID and location information to MDS 330, via communication link 325, with a request to perform an OOBL. In stage 4060 server 310 preferably transmits a message to user device 50A to login via user MD 60.

In stage 4070, MDS 330 transmits a request for secure login to user MD 60 via NS 340 as described above, which preferably prompts a user of user MD 60 to establish communication between user MD 60 and CE 100. In one embodiment communication is established by juxtaposing CE 100 with NFC communication interface 66 of MD 60, however this is not meant to be limiting in any way.

In stage 4080, communication is established between CE 100 and user MD 60 responsive to the prompt of stage 4070, and CE 100 transmits to application 62 of MD 60 an ID of CE 100, the encrypted password of stage 4000, the network addresses, optional location information, and user device ID received in stage 4050.

In stage 4090, application 62 transmits the received information of stage 4080 to MDS 330 over communication link 350. In stage 4100, MDS 330 validates the received information, such as consonance of location information, and consonance for the ID of CE 100, identifier of user device 50, encrypted password and network addresses, for consonance with information received from server 310 in stage 4070. In one embodiment MDS 330 transfer the encrypted password to server 310 for validation.

In the event that in stage 4100 all of the information received from MD 60 is consonant with information received from server 310, in stage 4110 MDS 330 transmits a validation message to server 310. In stage 4120 server 310 authorizes communication between server 310 and user device 50A over one of the links, such as SSTP link 370.

In optional stage 4130, highlights of transactions are transmitted from server 310 to MDS 330, and pushed to user MD 60 onto a display of user MD 60. In particular, to ensure security, an indication of the type of transaction being performed by user device 50A is transmitted to user MD 60 and displayed on a display device thereon, preferably chronologically. The indication is preferably displayed in chronological order in relation to other operations done from the beginning of the session, preferably in a graphical symbolized manner for easy user review. In the event that the user of MD 60 notes a discrepancy between operation of MD 60 and the chronological information displayed on user MD 60, an attack is noted and the user may disconnect from server 310. Optionally, a user may request further operation information via MD 60 or by terminating the web session due to suspicion of fraud. In another embodiment the user verifies that there are no indications of operations displayed on MD 60 which are not actually performed by the user of user device of 50A, since these indications can be signs of fraud attack. Preferably, the MD 60 monitoring stays active until the user logs off server 310 by user device 50A or by MD 60.

In the event that in stage 4100 any inconsonance occurs, in stage 4140 user MD 60 may sent a message to display that the transaction has failed, and user device 50A is denied login privileges.

The above has been described in an embodiment where authorization is performed by MDS 330, however this is not meant to be limiting in any way. Authorization can be similarly performed by server 310, or security server 320, without exceeding the scope.

Thus, the flow of FIG. 2C provides advanced security between user device 50A and server 310 via OOBL, continual out of band supervision and advanced security responsive to network addresses.

Figure 3A:
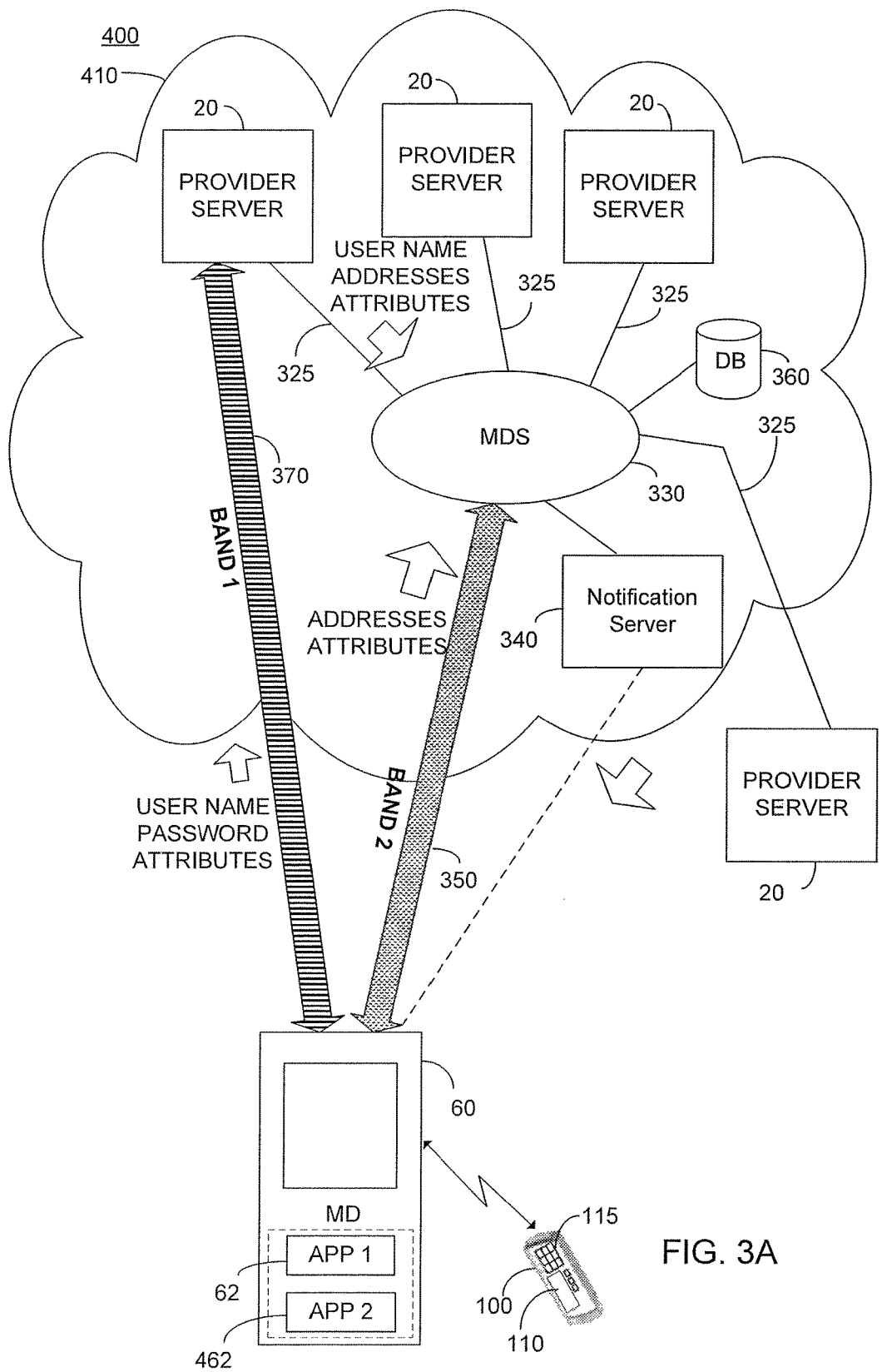
FIG. 3A illustrates a high level block diagram of an embodiment of a transaction system providing advantageous security in cooperation with a mobile device server, and further providing enhanced security by confirming consonance of some network addresses utilizing multiple band communication with a mobile device.

FIG. 3A illustrates a high level block diagram of an embodiment of a transaction system 400 providing advantageous security in cooperation with a mobile device server (MDS) 330, and further providing enhanced security by confirming consonance of some network addresses utilizing multiple band communication with an MD 60. Transaction system 400 further comprises: a cloud computing environment 410; a provider server 20 which may be not within cloud computing environment 410; and a CE 100 having an SE 110 and an input device 115. Cloud computing environment 410 comprises a plurality of independent provider servers 20, MDS 330 and NS 340. MD 60 comprises an application 62 and an application 462 each running on a processor of MD and stored on a local memory (not shown). In one embodiment, application 62 is associated with MDS 330, and application 462 is associated with cloud provider server 20. Each provider server 20 is in communication with MDS 330 via a respective communication link 325.

Figure 3B:
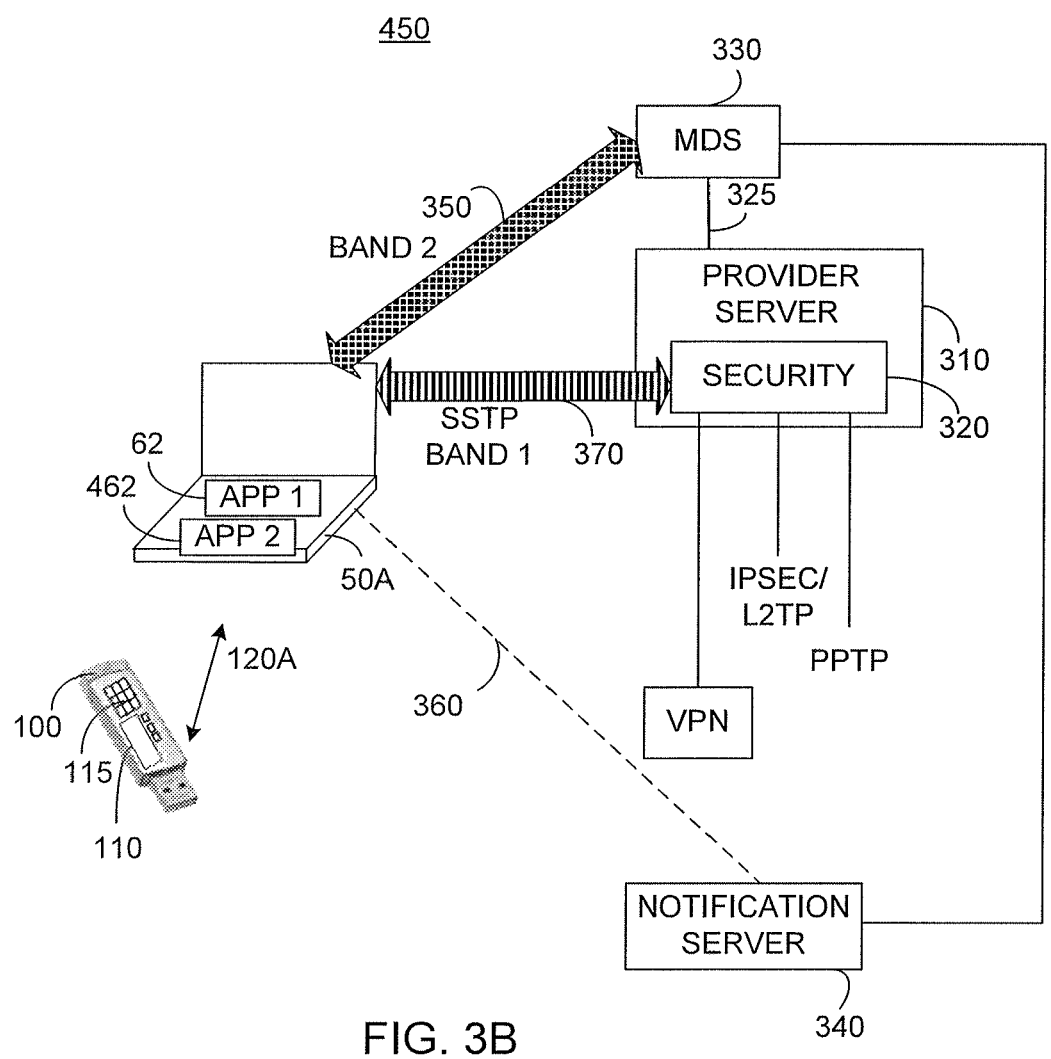
FIG. 3B illustrates a high level block diagram of an embodiment of a transaction system providing advantageous security for network applications in cooperation with a mobile device server, and further providing enhanced security by confirming consonance of some network addresses utilizing multiple band communication with a computing device.

FIG. 3B illustrates a high level block diagram of a transaction system 450 providing improved security for network applications, which may include LAN, intranet, or wide area networks, without limitation. Transaction system 450 exhibits user device 50A which may be a fixed station, or portable computing device, without limitation. Improved security is provided responsive to confirmation of consonance of network address information utilizing multiple band communication. Transaction system 450 is similar to system 400 with the exception that a user device 50A is provided in place of user MD 60. Application 62 and application 462 each respectively run on user device 50A, and user device 50A is in communication with MDS 330 via network connection 350, illustrated as a dot filled bi-directional path, and user device 50A is further in communication with NS 340 via a communication path 360, illustrated as a dashed line. For simplicity and clarity only a single provider server 310 is shown in communication with MDS 330, however this is not meant to be limiting in any way, a and a plurality of provider servers 310 may be provided, as described above in relation to transaction system 400 without exceeding the scope.

Figure 3C:
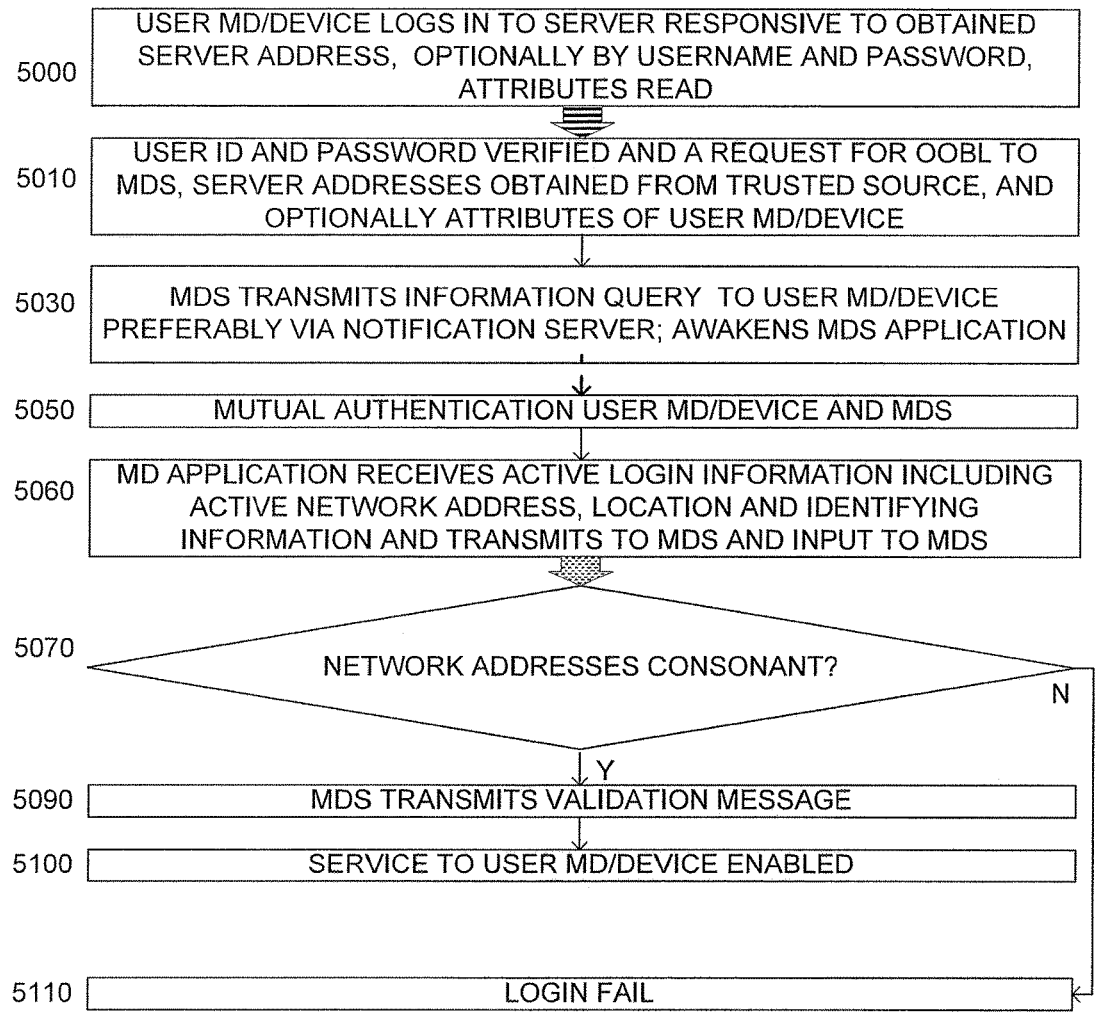
FIG. 3C illustrates a high level flow chart of the operation of the transaction systems of FIGS. 3A, 3B to provide advanced security utilizing network address consonance.

FIG. 3C illustrates a high level flow chart of the operation of the respective transaction systems 400, 450 of FIG. 3A and FIG. 3B, to provide advanced security utilizing network address consonance, FIGS. 3A, 3B and 3C being described together for clarity. In stage 5000, user MD 60 in transaction system 400, or user device 50A of transaction system 450, logs into a particular one of the plurality of provider servers 20, 310, supplying the relevant username and optionally a password optionally utilizing application 62. User MD 60, or user device 50A further preferably provides attributes such as hardware identifying information and location information without limitation. In transaction system 400 the username and password are thus transmitted over a first communication channel, denoted BAND 1, and shown as a bar filled bi-directional arrow. Communication between user MD 60, or user device 50A, is performed responsive to an address of provider server 20, 310 obtained by user MD 60, user device 50A. The address may be obtained by entering via a user gesture a web address, or other entry form, without limitation.

In stage 5010, the addressed server of stage 5000 validates the received user name and optionally the password, and transmits an OOBL request to MDS 330, including identification information, such as username, optionally location information regarding user device 50A or user MD 60, respectively, the actual network address, or addresses, associated with the addressed server of stage 5000. Optionally, additional information to be used for validation is provided, including without limitation, addresses and ports associated with user device 50A, user MD 60, that it is associated with the login request. Communication with MDS 330 is performed over the respective communication link 325. Thus, the address of provider server 20, 310 is transmitted to MDS 330 via a trusted source, such as provider server 20, 310, without limitation. In another embodiment, the address of provider server 20, 310 is stored in a database in communication with MDS 300, illustrated in FIG. 3A as DB 360. The term trusted source is meant to include any communication which may be relied on by MDS 330 and may not be repudiated by provider server 20, 310.

In stage 5030, MDS 330 transmits an information query to user device 50A, user MD 60, preferably via NS 340. Upon receipt of the information query at user MD 60, user device 50A, application 462 becomes active, preferably automatically, to respond to the information query. In stage 5050, application 462 and MDS 330 perform authentication, preferably mutually, via a communication channel 350, denoted herewith Band 2. In stage 5060, application 462 receives login information, preferably login communication information, preferably including addressed server network address, from the processor, and/or relevant memory locations of user device 50A, user MD 60, optionally utilizing application 62, and obtains other relevant information such as attributes of user device 50A, user MD 60, and location information, and preferably other identifying information, such as hardware and peripherals serial numbers, and transmits the obtained information to MDS 330 via communication channel 350 denoted herewith Band 2. The login information retrieved include local addresses, i.e. network addresses and ports associated with user device 50A, user MD 60, and foreign addresses, i.e. addresses and ports with which user device 50A, user MD 60 is communicating. The login information may further include digital fingerprint, digital signature, and server dynamic fingerprint information, without limitation. Thus, the login information input includes the obtained address of stage 5000 utilized for communication with provider server 20, 310. The received login information is input into MDS 330.

In stage 5070, MDS 330 compares the input login information with the request information of stage 5010. In particular, any received identifying information is compared with the received attributes to confirm identity. Additionally the list of login information, preferably login communication information, preferably including addressed server network addresses, preferably including digital signature, optionally including server dynamic fingerprint information, without limitation, is compared with the information in the request for consonance. Thus, the address associated with provider server 20, 310 obtained from the trusted source in stage 5010 is compared with the input received obtained network address associated with provider server 20, 310 of stage 5000. In the event of inconsonance of the addresses, i.e. the addresses of the request of stage 5010 are not found in the addresses transmitted in stage 5060, the link of Band 1 is shown to not be direct and is suspect of a fraudulent attack, such as a man in the middle attack. Optionally, location information retrieved by application 462 in stage 5060 is further verified for consonance with location information retrieved by the respective server of stage 5010.

In the event that in stage 5070, MDS 330 finds that the input login information including addresses and ports of stage 5060 are consonant with any of the addresses obtained from the trusted source of stage 5010, i.e. the addresses of stage 5010 are found in the list of addresses of stage 5060, and any other identifying information is similarly consonant, in stage 5090 MDS 330 transmits a validation message to the respective server of stage 5010. In response, in stage 5100 the server of stage 5010, i.e. the respective provider server 20, or server 310, enables provision of service to user MD 60 of stage 5000.

In the event of inconsonance in stage 5070, in stage 5110 login fails and the server of stage 5010 denies access.

Thus, the transaction flow of FIG. 3C provides increased multi-communication channel security, also known as 2 band security, for a single user MD 60, or user device 50A, respectively.

The above has been described in an embodiment wherein the user name and password are provided directly onto user device 50A, user MD 60, and transmitted over Band 1, however this is not meant to be limiting in any way. The user name and/or password may be encrypted by application 62, or an SE on user device 50A, user MD 60 without exceeding the scope. Similarly, as described above, the password may be entered on input device 115 of CE 110, encrypted by SE 110, and then transmitted to application 462 via NFC communication without exceeding the scope. In such an embodiment, key logger software is advantageously unable to surreptitiously obtain the user's password.

The above has been described in an embodiment wherein NS 340 is provided, and validation is accomplished by MDS 330, however this is not meant to be limiting in any way. In another embodiment NS 340 is not provided, and MDS 330 accomplishes all communication. In another embodiment validation is performed by one of application 462 and provider server 20 or server 310, respectively, responsive to the information as described above in relation to MDS 330. MDS 300 may be incorporation within one of the provider servers 20, or server 310, or be provided outside of cloud computing environment 410 without exceeding the scope. The above has been described in an embodiment wherein the transaction described is login access, however this is not meant to be limiting in any way. In another embodiment the transaction is non-access, i.e. a monetary transfer. In this embodiment the login information of stage 5000 may be substituted by other type of user entered information such as PIN code, or may not be included at all.

Figure 3D:
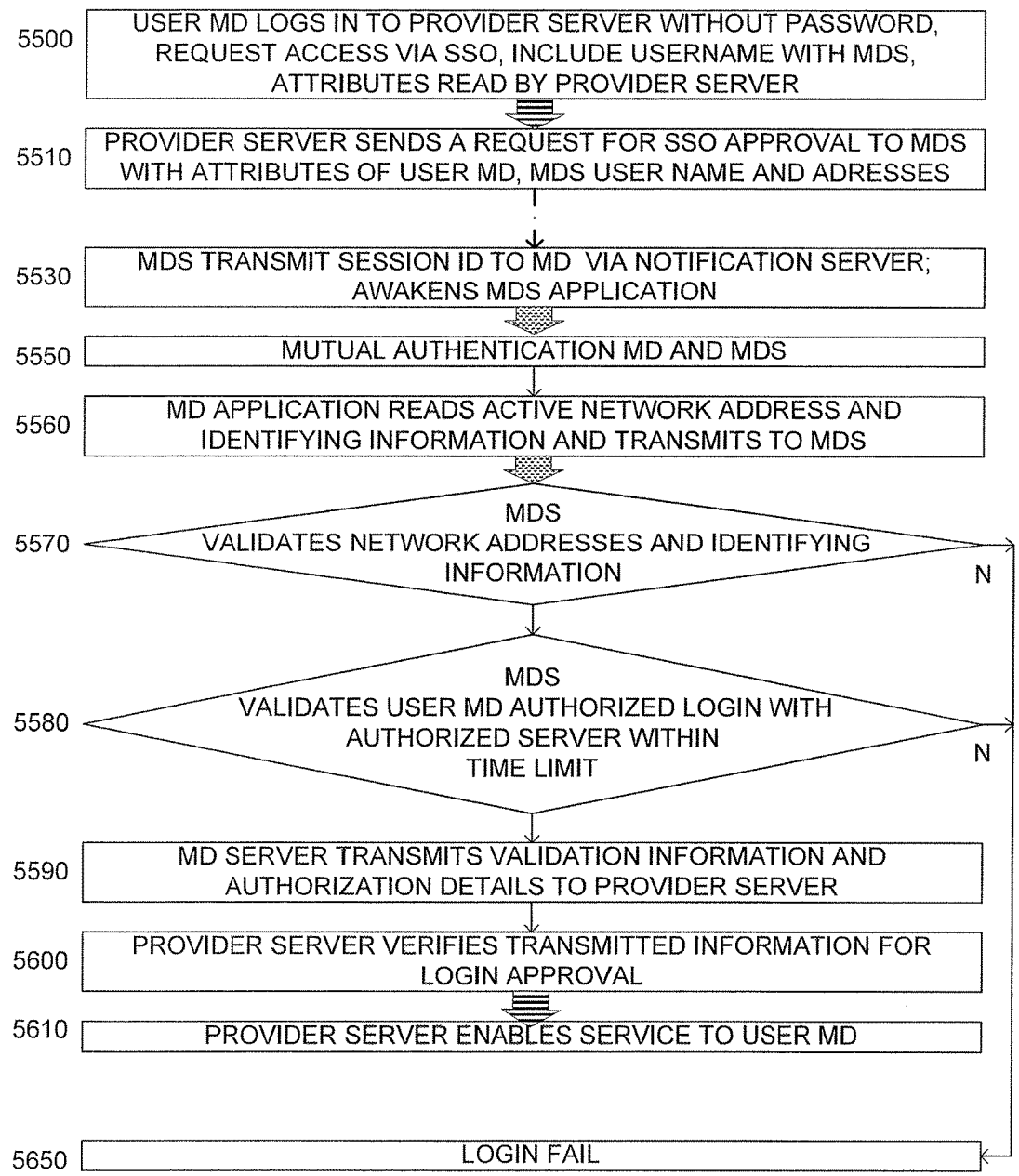
FIG. 3D illustrates a high level flow chart of the operation of the transaction system of FIG. 3A to provide single sign on functionality responsive to addresses.

FIG. 3D illustrates a high level flow chart of the operation of the transaction system of FIG. 3A to provide single sign on functionality. In particular, one or more of provider servers 20 may not require a user name and password for login under certain conditions, such as validation by a third party trusted entity, and may accept validation by MDS 330 in lieu of a user name and password to provide access. FIG. 3D is being particularly described in relation to transaction system 400 of FIG. 4A, however this is not meant to be limiting in any way.

In stage 5500 user MD 60 logs into a provider server 20 via application 62, with a request to authorize access responsive to a single sign on (SSO) authorization of a particular MDS 330, via a respective communication link 325. In one particular embodiment, the request to authorize access responsive to SSO is responsive to clicking on an icon displayed on a page shown by the selected provider server 20. A particular MDS 330 is preferably identified, since there is not limitation to the number of MDSs 330 allowed in transaction system 400. The username with the particular MDS 330 is provided, but the user name and password with the provider server 20 is preferably not provided. The attributes of user MD 60 are read, such as hardware identification information, location and addresses are noted as described above.

In stage 5510, the provider server 20 send a request for SSO to the identified MDS 330 including network address information, attribute information, as described above in relation to stage 5010, and the username registered with MDS 330.

In stage 5530, MDS 330 transmits a session ID to user MD 60 via NS 340, responsive to the username, which is converted to an address based on data stored in communication with MDS 330. Upon receipt of the session ID at user MD 60, application 462 becomes active, preferably automatically and without requiring user input, to respond to the session ID. In stage 5550, application 462 and MDS 330 perform mutual authentication via a communication channel, denoted herewith Band 2. In stage 5560, application 462 reads network addresses from the processor, and/or relevant memory locations of user MD 60, and obtains other relevant information such as attributes of MD 60, and location information, and preferably other identifying information, such as hardware and peripheral serial numbers, and transmits the read information to MDS 330 via Band 2. The addresses retrieved include local addresses, i.e. network addresses associated with user MD 60, and foreign addresses, i.e. addresses with which user MD 60 is communicating.

In stage 5570, MDS 330 compares the received information with the request information of stage 5010. In particular, any received identifying information is compared with the received attributes to confirm identity. Additionally the list of addresses is compared with the addresses in the request for consonance. In the event of inconsonance of the addresses, i.e. the addresses of the request of stage 5510 are not found in the addresses transmitted in stage 5560; the link of Band 1 is shown to not be direct and is suspect of a fraudulent attack, such as a man in the middle attack. Optionally, location information retrieved by application 462 in stage 5560 is further verified for consonance with location information retrieved by provider server 20 of stage 5510.

In the event of consonance in stage 5570, in optional stage 5580, MDS 330 checks authorized provider servers 20 to determine if a validated login, with username and password has occurred within a predetermined time limit. It is to be understood, that since validation is being performed for a plurality of provider servers 20 by MDS 330, for each validated login the more security value is accumulated at MDS 330. Thus, a user MD 60 which has logged in successfully a plurality of times over a predetermined time period may be trusted more than a user MD 60 that has logged in only occasionally. The accepted rules of verification are pre-determined between service provider 20 and MDS 330. For example, in the event that the rule is at least one trusted entity, and at least one validated login with the predetermined period has been found in optional stage 5580, in stage 5590, MDS 330 transmits a validation message and authorization details to the requesting provider server 20 of stage 5510. In response, in stage 5610 provider server 20 enables provision of service to user MD 60 of stage 5000.

In the event of inconsonance in stage 5570, or failure to identify an appropriate login in optional stage 5580, in stage 5650 login fails and provider server 20 denies access.

Thus, the transaction flow of FIG. 3C provides SSO functionality responsive to MDS 330.

Referring now to stage 5070 of FIG. 3C, it is to be understood that the technique of FIG. 3D may be applied thereto. Thus, MDS 330 may be arranged to takes in account the validation history of user device 50A, or user MD 60, without limitation. Since validation is being performed for a plurality of provider servers 20 by MDS 330, each validated login increases the security value for user MD 60 accumulated at MDS 330. Thus, a user MD 60 which has logged in successfully a plurality of times over a predetermined time period may be trusted more than a user MD 60 that has logged in only occasionally. Thus, in one embodiment, a provider server 20 of high security may require a trail of validated logins as an additional login hurdle.

Figure 3E:
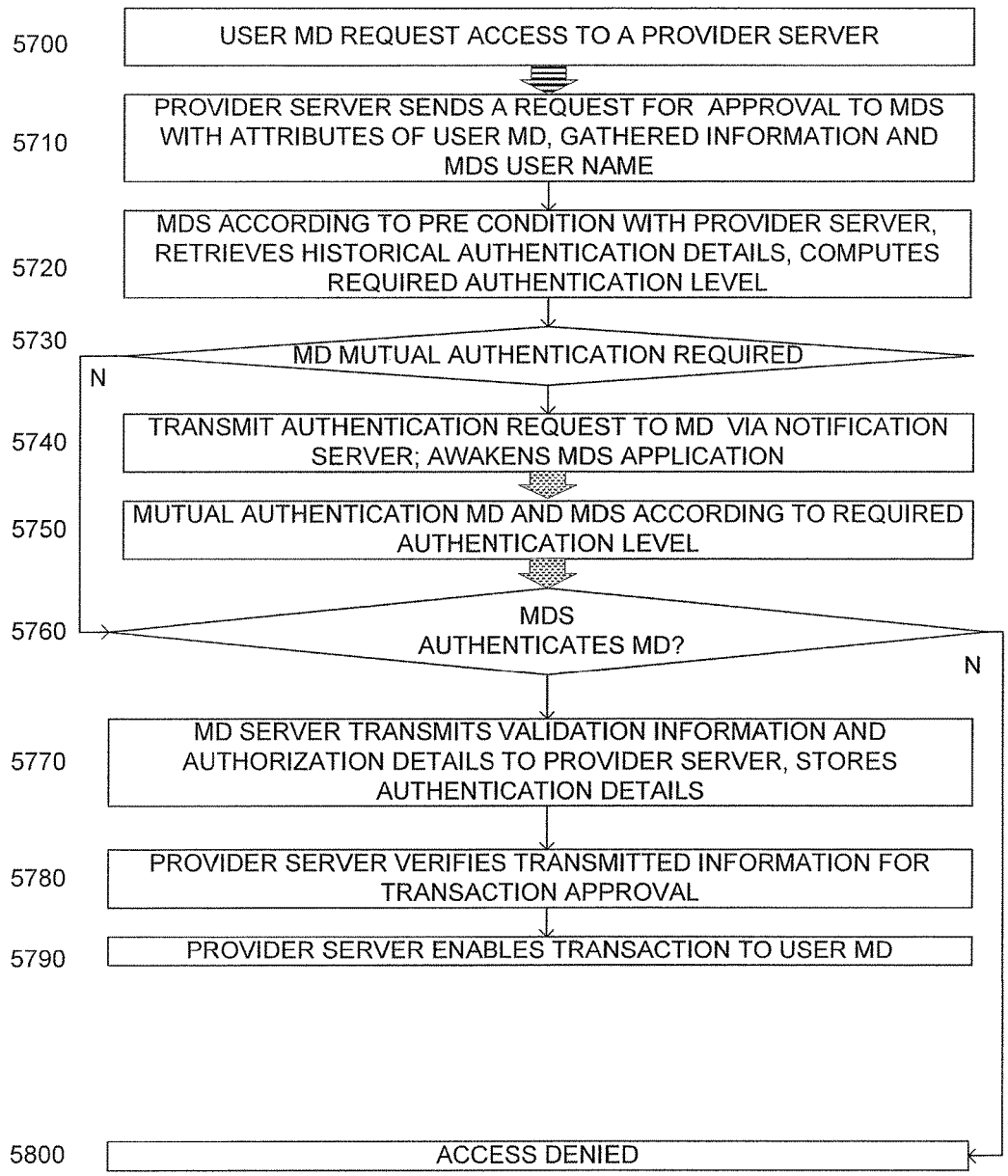
FIG. 3E illustrates a high level flow chart of the operation of the transaction system of FIG. 3A to provide single sign on functionality responsive to authentication history.

FIG. 3E illustrates a high level flow chart of the operation of the transaction system of FIG. 3A to provide historic information based sign on functionality. In particular, one or more of provider servers 20 may not require a user name and password for login under certain conditions, such as validation by a third party trusted entity, and may accept validation by MDS 330 in lieu of a user name and password to provide access. FIG. 3E is being particularly described in relation to transaction system 400 of FIG. 4A, however this is not meant to be limiting in any way, and is capable of providing generic historic sign on functionality.

In stage 5700 user MD 60 request access to a provider server 20 preferably via application 462, via a respective communication link 370 A particular MDS 330 is preferably identified, since there is not limitation to the number of MDSs 330 allowed in transaction system 400. The username with the particular MDS 330 is provided, but the password with the provider server 20 is preferably not provided. The attributes of user MD 60 are read, such as hardware identification information, location and addresses are noted as described above. In one embodiment user device 50A requests access to a provider server 20.

In stage 5710, the provider server 20 send a request for approval to the identified MDS 330 including attributes of user MD 60, other optional information, such as addresses, attribute information, and the username registered with MDS 330.

In stage 5720, responsive to pre-registered conditions with provider server 20, MDS 330 retrieves historical authentication details in relation to user MD 60, and determines the present authentication level.

In stage 5730, the present authentication level of user MD 60 is compared with the pre-registered condition for provider server 20. In the event that that the present authentication level is greater than the pre-registered required condition level for historic sign on authorization, such that mutual authentication of user MD 60 is not required by provider server 20, in stage 5760 MDS 330 authenticates user MD 60, responsive to historical authentication details. In the event that authentication is successful, in stage 5770 MDS 330 transmits validation information and authorization details to provider server 20, and further stores the authentication details in an associated memory.

In stage 5780, provider server 20 verifies the transmitted validation information and authorization information, and in stage 5790 provider server 20 enables a transaction with user MD 60 responsive to the transmitted validation information and authorization information of stage 5770.

In the event that in stage 5760 authentication is not successful, in stage 5800 access is denied.

In the event that in stage 5730 the present authentication level is not greater than the pre-registered required condition level for historic sign on authorization, such that mutual authentication of user MD 60 is required by provider server 20, in stage 5740 MDS 330 transmits an authentication request to user MD 60, preferably via NS 340, which awakens user MD application 62. In stage 5750 mutual authentication is performed between user MD 60 and MDS 330, responsive to the required authentication level of provider server 20. In stage 5760, as described above, MDS 330 authenticates user MD 60.

The above has been particularly described in relation to authentication responsive to network addresses, however this is not meant to be limiting in any way. In place of network address a digital fingerprint, such as a digital signature may be utilized, without exceeding the scope. In one embodiment, the digital fingerprint comprises server dynamic information.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to". The term "connected" is not limited to a direct connection, and connection via intermediary devices is specifically included.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. An apparatus, comprising:
a mobile device server (MDS) including a processor and associated with a memory, the MDS configured to:
be operably coupled to a provider server that communicates with a registered user device (RUD) on a first band during a time period, the RUD being registered with the MDS prior to the time period;
receive, from the provider server, a transaction authorization request including user identification and to authorize a user access from the RUD to a resource associated with the provider server;
based on the user identification, retrieve, from the memory, a registered user device identifier associated with the user identification and identifying the RUD;
generate a notification for the RUD including (1) a generated session identifier (SID) and (2) a prompt to connect to the MDS via a second band;
send, via a notification server, the notification to the RUD such that the RUD, in response to receiving the notification, sends to the MDS a response;
receive, from the RUD, the response including a received SID;
complete an out of band (OOB) supervision approval and authenticate the RUD by determining that the received SID matches the generated SID;

send, to the RUD and via the second band, an information query;

receive, in response to the information query and via the second band, information generated by the RUD;

complete the transaction authorization request based on (1) the completing the OOB supervision approval and the authenticating the RUD, and (2) verifying at least one factor based on the information generated by the RUD and predefined stored information; and based on the completing the transaction authorization request, send, to the provider server, a signal representing an approval of the transaction authorization request to authorize access to the resource from the RUD.

2. The apparatus of claim 1, wherein the MDS is further configured to receive, in response to the information query, a user-provided input received at the RUD, the MDS configured to complete the transaction authorization request based at least in part on the user-provided input received at the RUD.

3. The apparatus of claim 1, wherein the RUD is a user mobile device.

4. The apparatus of claim 1, wherein the RUD is one of a laptop user device, a tablet user device, a personal digital assistant (PDA) user device, or a desktop user device.

5. The apparatus of claim 1, wherein the prompt causes the RUD to automatically connect with the MDS via the second band and without an intervention of the user.

6. The apparatus of claim 1, wherein the MDS authenticates the RUD via a registered application that is executable on the RUD.

7. The apparatus of claim 1, wherein the information query includes a cryptographic mutual authentication between the RUD and the MDS.

8. The apparatus of claim 1, wherein the information generated by the RUD includes at least one of an internet protocol (IP) network address of the provider server, a hardware fingerprint associated with the RUD, a software fingerprint associated with the RUD, a digital fingerprint, a digital signature, server dynamic fingerprint information, or location information.

9. The apparatus of claim 1, wherein the prompt causes an application executable on the RUD and associated with the MDS to become active.

10. The apparatus of claim 1, wherein the information query includes information associated with the user identification to authenticate the user.

11. The apparatus of claim 1, wherein the MDS is configured to communicate with the notification server via a communication that is secured by a certificate, and the notification server is configured to communicate with the RUD via a communication that is secured by a token.

12. The apparatus of claim 1, wherein the information generated by the RUD includes at least one active network Internet Protocol (IP) address, the predefined stored information includes a network IP address of the provider server, and the MDS is further configured to (1) detect that the provider server is communicating with the RUD and (2) detect that there is no man-in-the-middle (MITM) attack associated with the transaction authorization request, when the at least one active network IP address matches the network IP address of the provider server.

13. The apparatus of claim 1, wherein the transaction authorization request is a first transaction authorization request, the information generated by the RUD includes at least one active network Internet Protocol (IP) address, the predefined stored information includes a network IP address of the provider server, and the MDS is further configured to:

receive, from the provider server communicating with a user device different from the RUD, a second transaction authorization request to authorize the user access from the user device to the resource associated with the provider server;

detect that the user device is one of an unregistered user device (UUD) or a fraudster device when the at least one active network IP address received from the RUD does not match the network IP address of the provider server based on the predefined stored information;

in response to the detecting that the user device is one of a UUD or a fraudster device, send an additional information query to the RUD that requests the user to approve or deny the transaction authorization request;

when an approval is received from the user, detect that the user device is a UUD and send to the provider server a signal representing an approval of the second transaction authorization request to authorize access to the resource from the UUD; and when a denial is received from the user, detect that the user device is a fraudster device and send to the provider server a signal representing a denial of the second transaction authorization request.

14. The apparatus of claim 1, wherein the MDS is configured to receive the transaction authorization request based on the provider server sending the transaction authorization request in response to a login request from the RUD.

15. A method, comprising:

receiving, from a provider server and at a mobile device server (MDS) operatively coupled to the provider server that communicates with a registered user device (RUD) on a first band during a time period, a transaction authorization request (1) including user identification and (2) to authorize a user access from the RUD to a resource associated with the provider server, the RUD being registered with the MDS prior to the time period;

based on the user identification, retrieving, at the MDS and from a memory associated with the MDS, a registered user device identifier associated with the user identification and identifying the RUD;

generating, at the MDS, a notification for the RUD including (1) a generated session identifier (SID) and (2) a prompt to connect to the MDS via a second band;

sending, from the MDS via a notification server, the notification to the RUD such that the RUD, in response to receiving the notification, sends to the MDS a response;

receiving, at the MDS and from the RUD, the response including a received SID;

completing, at the MDS, an out of band (OOB) supervision approval and authenticating the RUD by determining that the received SID matches the generated SID;

sending, to the RUD and via the second band, an information query;

receiving, in response to the information query and at the MDS via the second band, information generated by the RUD;

completing, at the MDS, the transaction authorization request based on (1) the completing the OOB supervision approval and the authenticating the RUD, and (2) verifying at least one factor based on the information generated by the RUD and predefined stored information; and based on the completing the transaction authorization request, sending, from the MDS to the provider server, a signal representing an approval of the transaction authorization request to authorize access to the resource from the RUD.

16. The method of claim 15, further comprising:
receiving, at the MDS, and in response to the information query, a user-provided input received at the RUD,
the completing the transaction authorization request based at least in part on the user-provided input received at the RUD.

17. The method of claim 15, wherein the RUD is a user mobile device.

18. The method of claim 15, wherein the RUD is one of a laptop user device, a tablet user device, a personal digital assistant (PDA) user device, or a desktop user device.

19. The method of claim 15, wherein the prompt causes the RUD to automatically connect with the MDS via the second band and without an intervention of the user.

20. The method of claim 15, further comprising registering, prior to the time period, the RUD via a registered application that is executable on the RUD.

21. The method of claim 15, wherein the information query includes a cryptographic mutual authentication between the RUD and the MDS.

22. The method of claim 15, wherein the information generated by the RUD includes at least one of an internet protocol (IP) network address of the provider server, a hardware fingerprint associated with the RUD, a software fingerprint associated with the RUD, a digital fingerprint, a digital signature, server dynamic fingerprint information, or location information.

23. The method of claim 15, wherein the prompt causes an application executable on the RUD and associated with the MDS to become active.

24. The method of claim 15, wherein the information query includes information associated with the user identification to authenticate the user.

25. The method of claim 15, wherein the MDS is configured to communicate with the notification server via a communication that is secured by a certificate, and the notification server is configured to communicate with the RUD via a communication that is secured by a token.

26. The method of claim 15, wherein the information generated by the RUD includes at least one active network Internet Protocol (IP) address, the predefined stored information includes a network IP address of the provider server, the method further comprising:
detecting that (1) the provider server is communicating with the RUD and (2) there is no man-in-the-middle (MITM) attack associated with the transaction authorization request, when the at least one active network IP address matches the network IP address of the provider server.

27. The method of claim 15, wherein the transaction authorization request is a first transaction authorization request, the information generated by the RUD includes at least one active network Internet Protocol (IP) address, and the predefined stored information includes a network IP address of the provider server, the method further comprising:
receiving, from the provider server communicating with a user device different from the RUD, a second transaction authorization request to authorize the user access from the user device to the resource associated with the provider server;
detecting that the user device is one of an unregistered user device (UUD) or a fraudster device when the at least one active network IP address received from the RUD does not match the network IP address of the provider server based on the predefined stored information;
in response to the detecting that the user device is one of a UUD or a fraudster device, sending an additional information query to the RUD that requests the user to approve or deny the transaction authorization request;
when an approval is received from the user, detecting that the user device is a UUD and sending to the provider server a signal representing an approval of the second transaction authorization request to authorize access to the resource from the UUD; and
when a denial is received from the user, detecting that the user device is a fraudster device and sending to the provider server a signal representing a denial of the second transaction authorization request.

28. The method of claim 15, wherein the receiving the transaction authorization request is based on the provider server sending the transaction authorization request in response to a login request from the RUD.

* * * * *